US012027327B2

(12) United States Patent
Hong et al.

(10) Patent No.: US 12,027,327 B2
(45) Date of Patent: Jul. 2, 2024

(54) COMPOSITE INPUT DEVICE

(71) Applicant: ALPS ALPINE CO., LTD., Tokyo (JP)

(72) Inventors: Minseok Hong, Gwangju (KR); Dongmin Choi, Gwangju (KR)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/052,640

(22) Filed: Nov. 4, 2022

(65) Prior Publication Data

US 2023/0154701 A1 May 18, 2023

(30) Foreign Application Priority Data

Nov. 17, 2021 (JP) ................................ 2021-187132

(51) Int. Cl.
*H01H 19/14* (2006.01)
*H01H 25/06* (2006.01)

(52) U.S. Cl.
CPC .......... *H01H 19/14* (2013.01); *H01H 25/065* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; H01H 19/14; H01H 19/11; H01H 19/585; H01H 19/58; H01H 19/62; H01H 19/635; H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01
See application file for complete search history.

(56) References Cited

U.S. PATENT DOCUMENTS

| | | | | |
|---|---|---|---|---|
| 7,087,848 | B1 * | 8/2006 | Yamasaki | H01H 25/041 200/18 |
| 8,263,882 | B2 * | 9/2012 | Laurent | G05G 9/04796 200/6 A |
| 9,793,074 | B2 * | 10/2017 | Yamanaka | H01H 19/025 |
| 2009/0008233 | A1 | 1/2009 | Saomoto | |
| 2010/0270133 | A1 * | 10/2010 | Baker | H01H 25/041 200/4 |
| 2012/0286978 | A1 * | 11/2012 | Yamazaki | G05G 9/047 341/35 |

FOREIGN PATENT DOCUMENTS

| | | |
|---|---|---|
| JP | 2009-016114 | 1/2009 |

* cited by examiner

*Primary Examiner* — Ahmed M Saeed
(74) *Attorney, Agent, or Firm* — IPUSA, PLLC

(57) ABSTRACT

The composite input device includes a first detector configured to detect a rotating operation, a second detector configured to detect a tilting operation, and a substrate disposed perpendicular to a rotational axis of the rotating operation. In a plan view in a direction perpendicular to the substrate, the first detector is disposed inside an imaginary circle. The imaginary circle has a center at an intersection of the substrate and an the rotational axis of the rotating operation and has an outer circumference that passes through an outer edge of the second detector positioned farthest away from the center of the imaginary circle.

11 Claims, 24 Drawing Sheets

100

100

COMPOSITE INPUT DEVICE

CROSS-REFERENCE TO RELATED APPLICATIONS

This application is based on and claims priority to Japanese Patent Application No. 2021-187132, filed on Nov. 17, 2021, the entire contents of which are incorporated herein by reference.

BACKGROUND OF THE INVENTION

1. Field of the Invention

The disclosures herein generally relate to composite input devices.

2. Description of the Related Art

Patent Document 1 listed below discloses an electrical composite-operation type component that includes a knob for receiving inputs from tilting, rotating, and pressing operations.

However, since the components (an annular rotor and a rotational motion detection sensor) for detecting the rotation input are arranged further outside than the component (an outer shaft) that tilts together with the knob, the equipment footprint of the electrical composite-operation type component disclosed in Patent Document 1 is large.

RELATED-ART DOCUMENTS

Patent Documents

[Patent Document 1] Japanese Patent Application Publication No. 2009-16114

SUMMARY OF THE INVENTION

A composite input device according to one embodiment includes a first detector configured to detect a rotating operation; a second detector configured to detect a tilting operation; and a substrate disposed perpendicular to a rotational axis of the rotating operation. In a plan view in a direction perpendicular to the substrate, the first detector is disposed inside an imaginary circle. The imaginary circle has a center at an intersection of the substrate and the rotational axis of the rotating operation and has an outer circumference that passes through an outer edge of the second detector positioned farthest from the center of the imaginary circle.

BRIEF DESCRIPTION OF THE DRAWINGS

Other objects and further features of the present disclosure will be apparent from the following detailed description when read in conjunction with the accompanying drawings, in which.

DESCRIPTION OF THE PREFERRED EMBODIMENTS

An embodiment will be described hereinafter with reference to the accompanying drawings.

According to one embodiment, a composite input device that has a small equipment footprint can be implemented.

(Outline of Composite Input Device 100)

Figure 1:
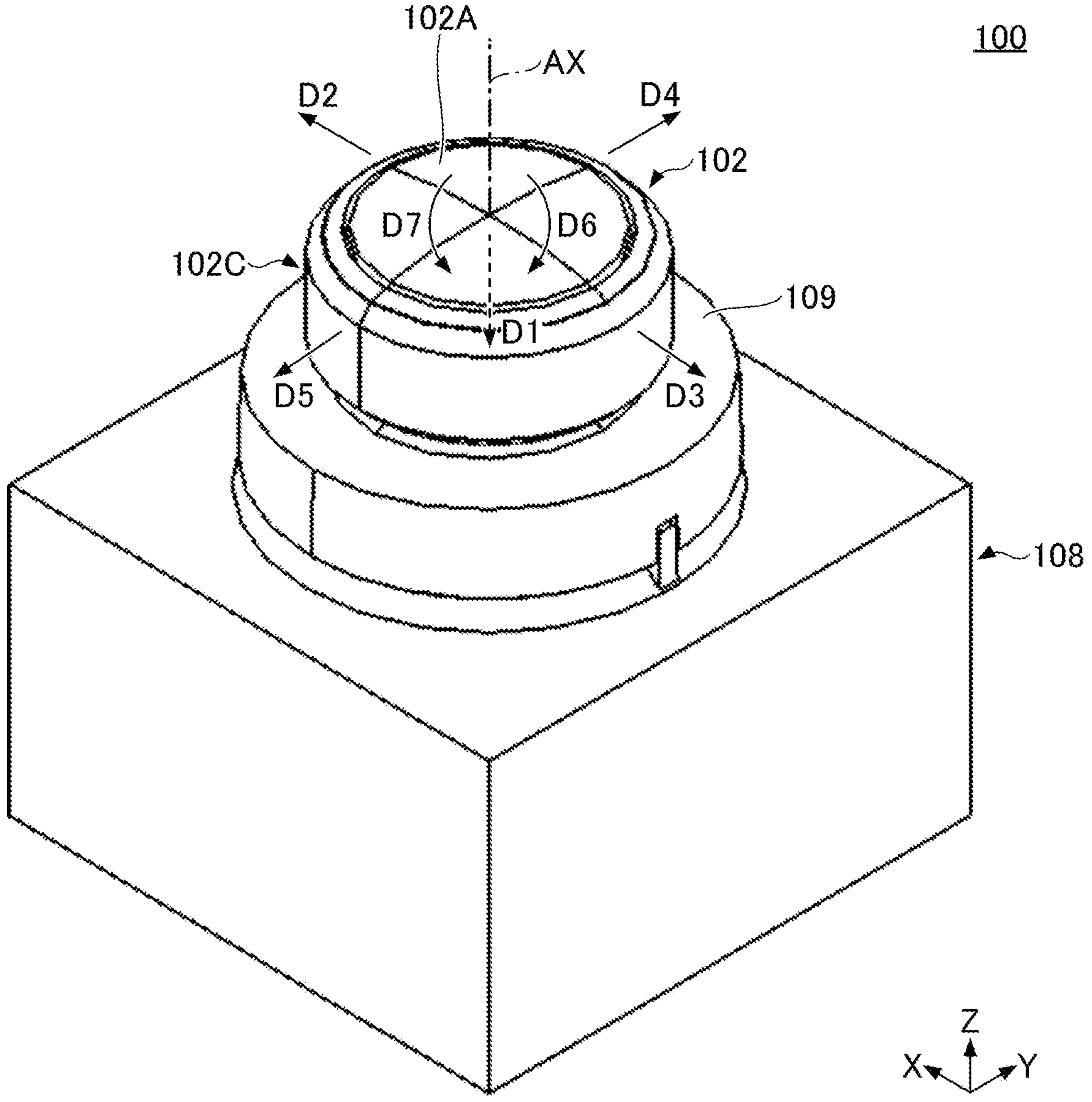
FIG. 1 is an outer perspective view of a composite input device according to one embodiment.

FIG. 1 is an outer perspective view of a composite input device 100 according to the embodiment. For the sake of descriptive convenience in the following description, assume that the X-axis direction is the front-rear direction, the Y-axis direction is the left-right direction, and the Z-axis is the vertical direction. Note that the +X-axis direction is the front direction, the +Y-axis direction is the right direction, and the +Z-axis is the upper direction.

The composite input device 100 illustrated in FIG. can be used as, for example, a composite input device for operating a device (for example, a power seat) installed in a vehicle such as an automobile. As illustrated in FIG. 1, the composite input device 100 includes a housing 108 having a rectangular cuboid shape and a knob 102 provided so as to protrude upward from an upper surface of the housing 108. An operator can operate the composite input device 100 by pressing, tilting, and rotating the knob 102. When released from the operating force from the operator, the knob 102 of the composite input device 100 returns to a neutral position illustrated in FIG. 1.

The operator can perform pressing and sliding operations on the composite input device 100 by pressing and sliding a first operation portion 102A of the knob 102 along a rotational axis AX in a pressing direction D1 (downward in the −Z-axis direction).

The operator can also perform tilting operations on the composite input device 100 by tilting the knob 102 in each of a tilting direction D2 (frontward in the +X-axis direction), a tilting direction D3 (rearward in the −X-axis direction), and a tilting direction D4 (rightward in the +Y-axis direction) that are perpendicular to the rotational axis AX. The operator can also perform an operation to tilt the knob 102 in a tilting direction D5 (leftward in the −Y-axis direction).

The operator can also perform rotating operations on the composite input device 100 by rotating a second operation portion 102C of the knob 102 in each of a rotation direction D6 (clockwise direction) and a rotation direction D7 (counterclockwise direction) that are centered on the rotational axis AX. The operation to rotate the knob 102 in the rotation direction D6 is performed within the range of a stroke in which the angle of the second operation portion 102C is shifted clockwise by a predetermined angle θ with reference to the neutral position illustrated in FIG. 1. The operation to rotate the knob 102 in the rotation direction D7 is performed within the range of a stroke in which the angle of the second operation portion 102C is shifted counterclockwise by a predetermined angle −θ with reference to the neutral position. In this embodiment, the predetermined angle θ is 20'.

(Configuration of Composite Input Device 100)

Figure 2:
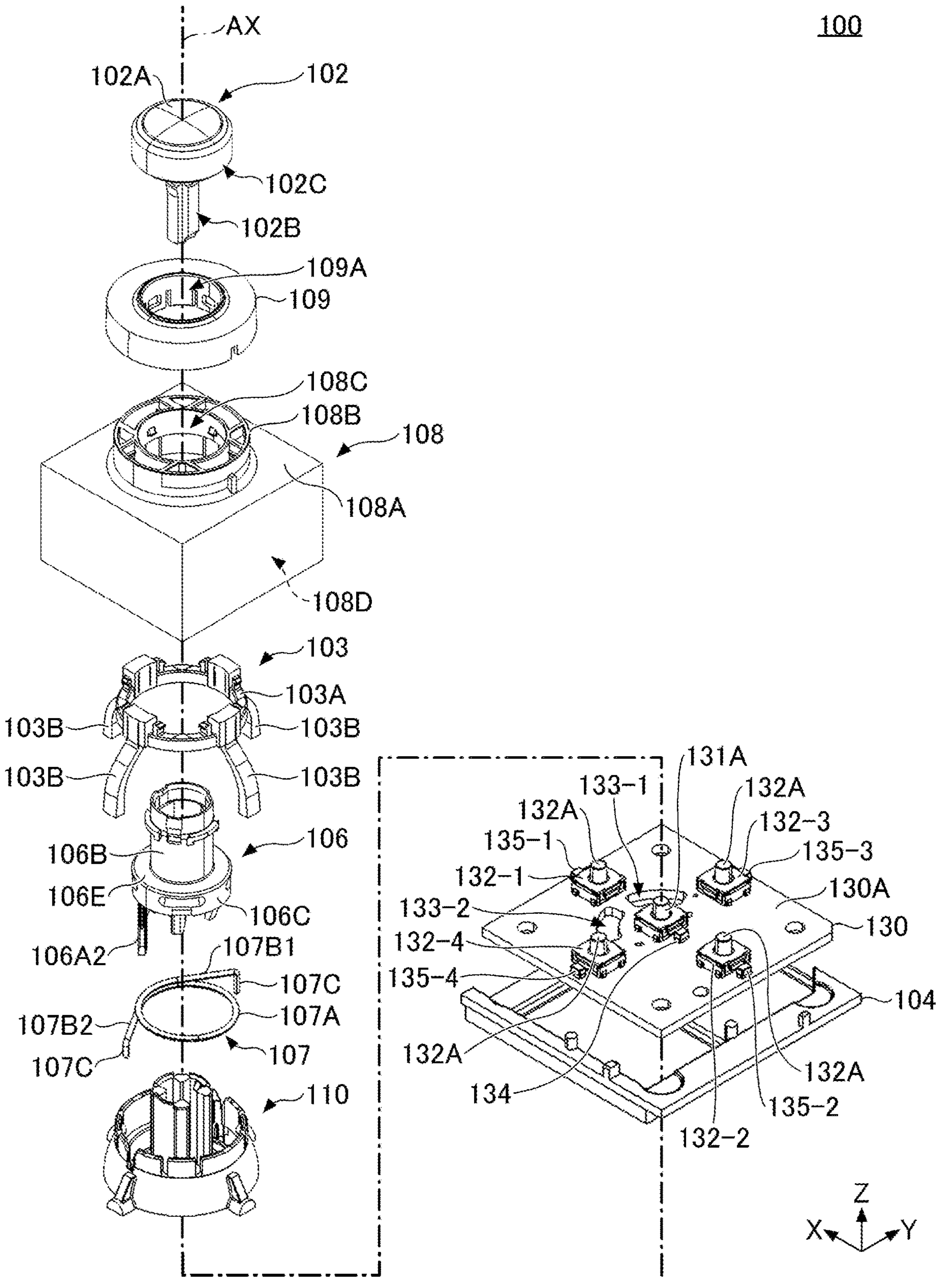
FIG. 2 is an exploded perspective view of the composite input device according to the embodiment.
Figure 3:
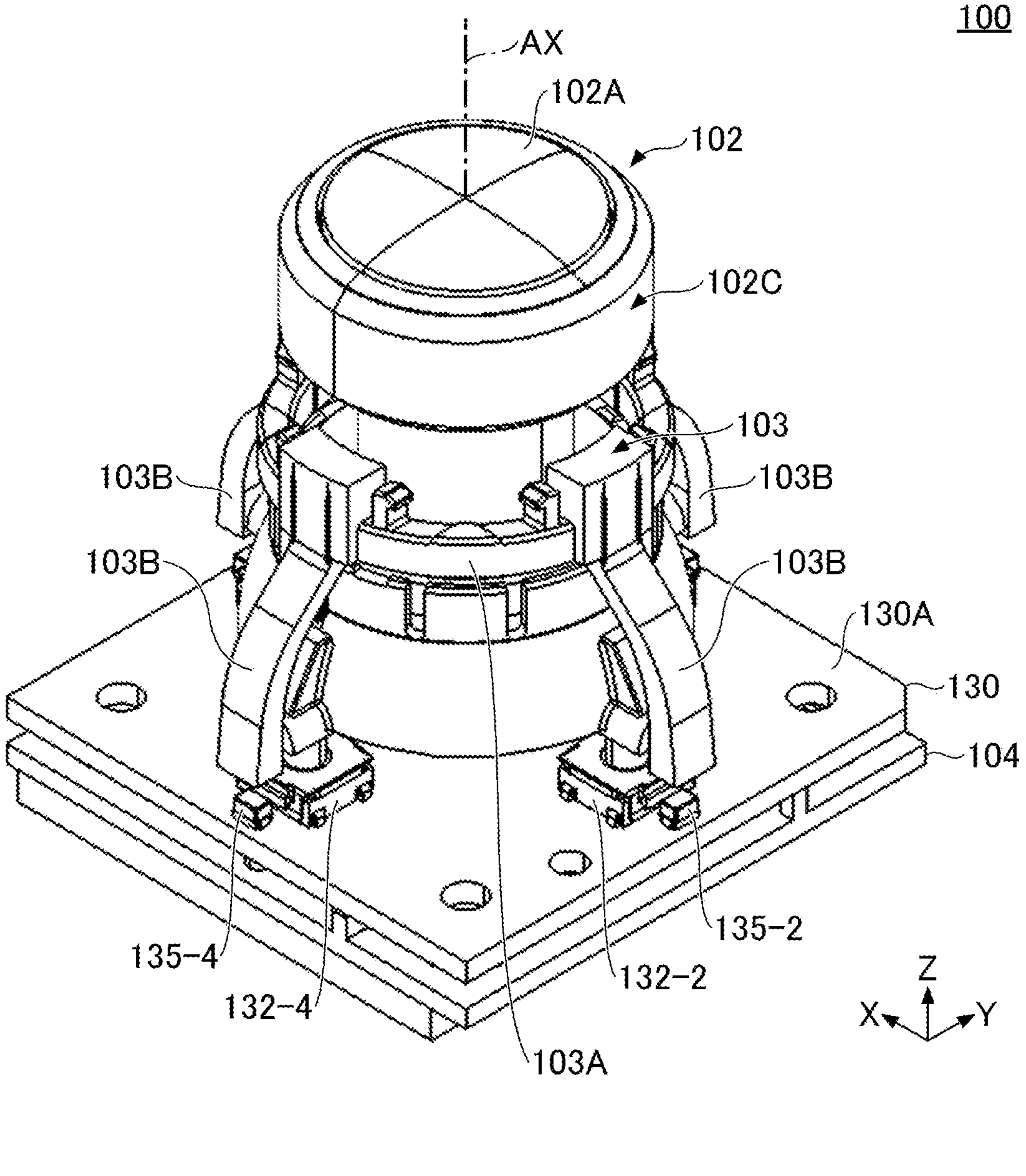
FIG. 3 is an outer perspective view of the composite input device according to the embodiment without the illustration of a housing.
Figure 4:
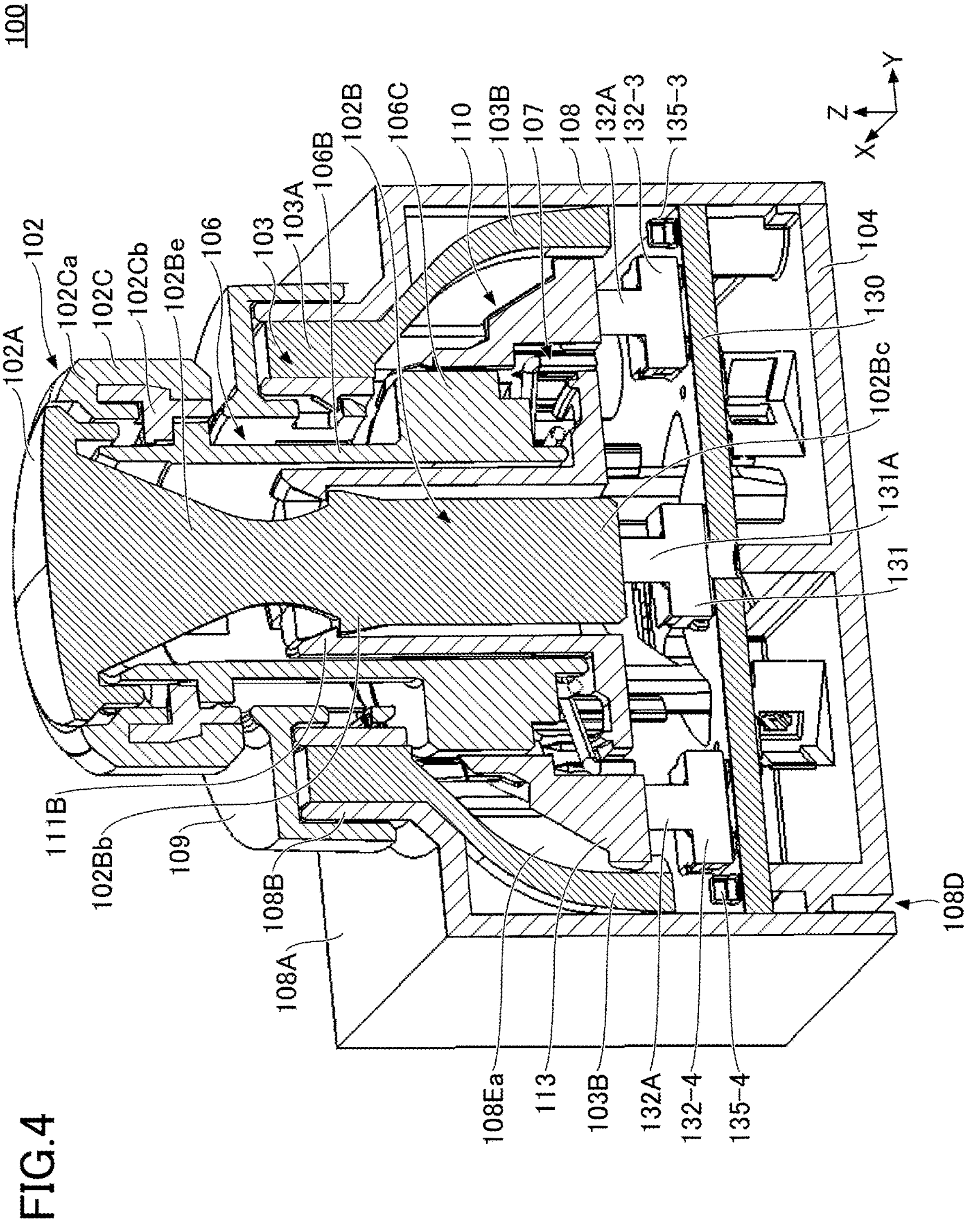
FIG. 4 is a perspective view of a cross-section of the composite input device according to the embodiment.
Figure 13A:
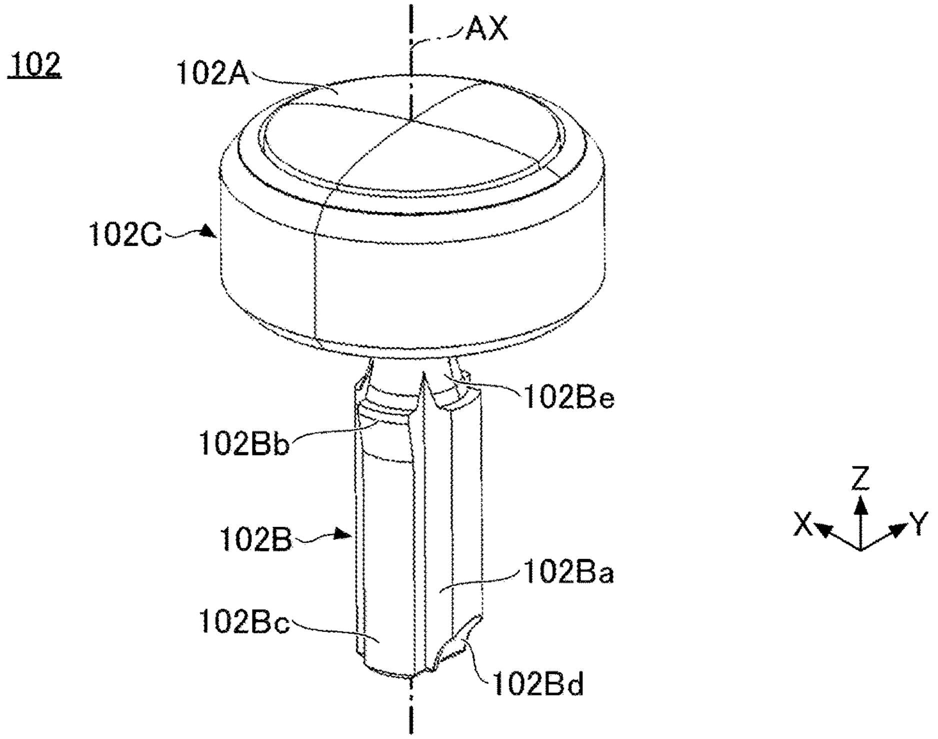
FIG. 13A is a perspective view of a knob included in the composite input device according to the embodiment.
Figure 13B:
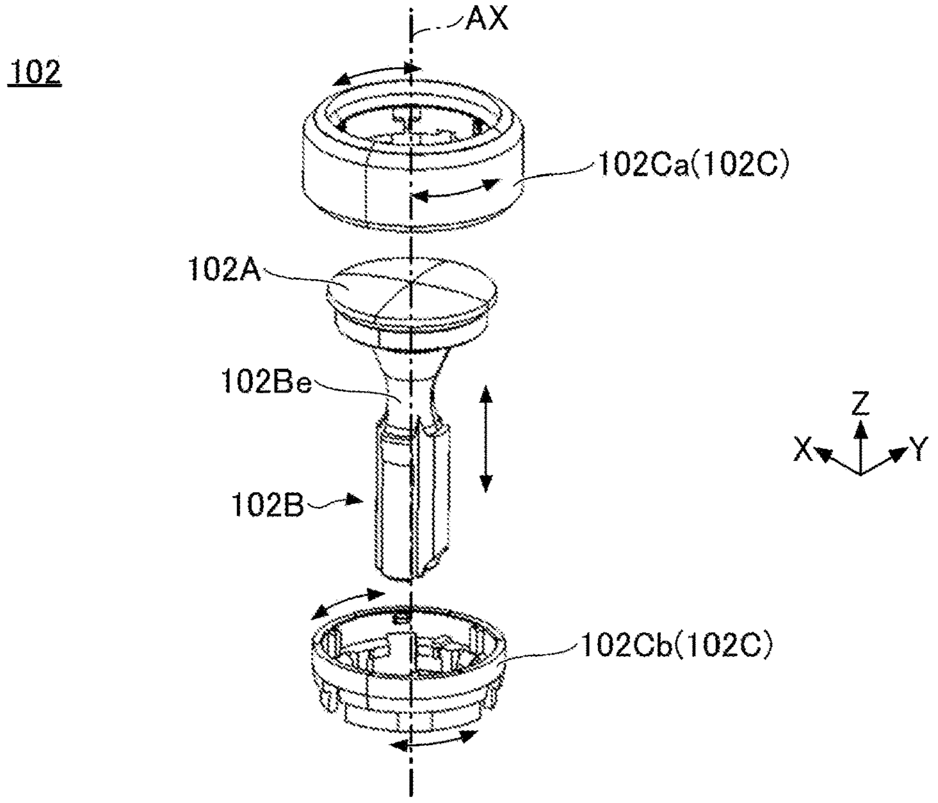
FIG. 13B is an exploded view of the knob included in the composite input device according to the embodiment.
Figure 14:
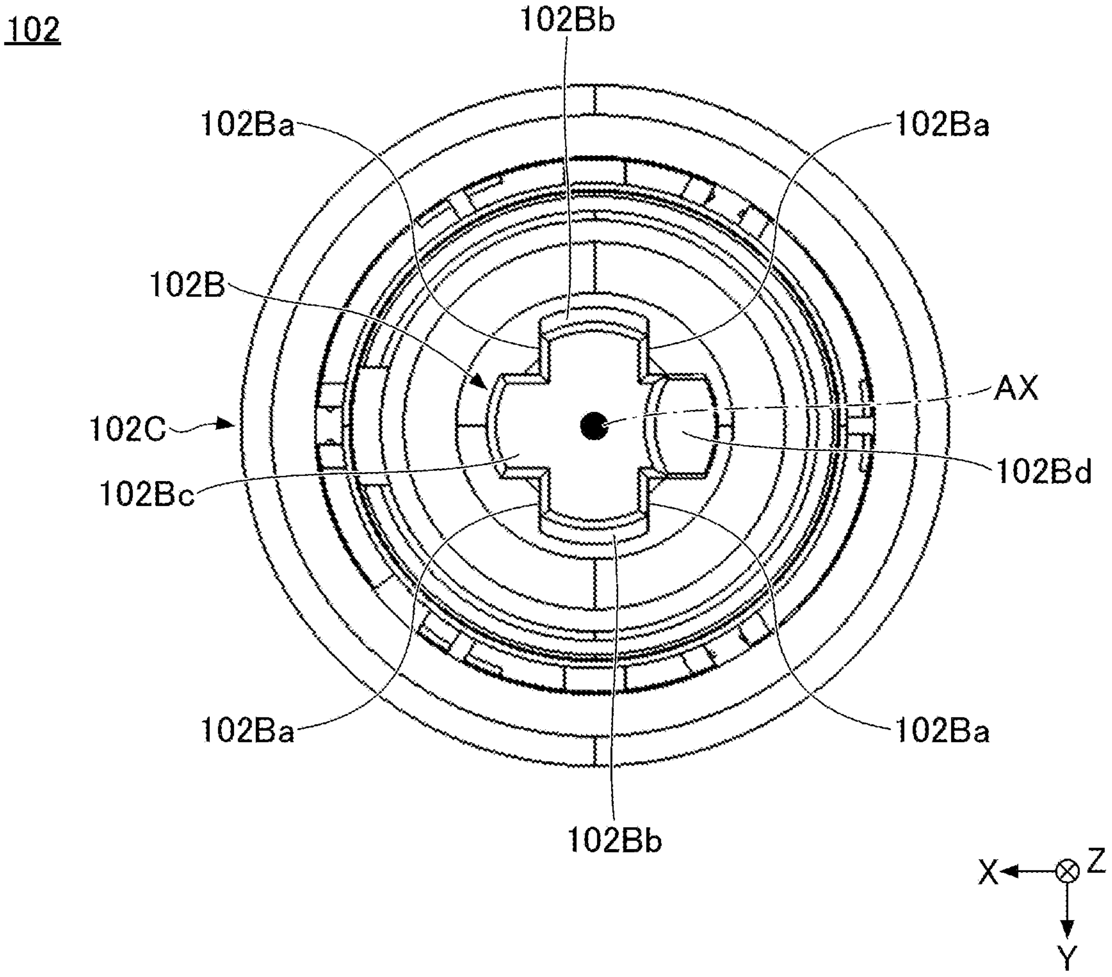
FIG. 14 is a bottom view of the knob included in the composite input device according to the embodiment.
Figure 19:
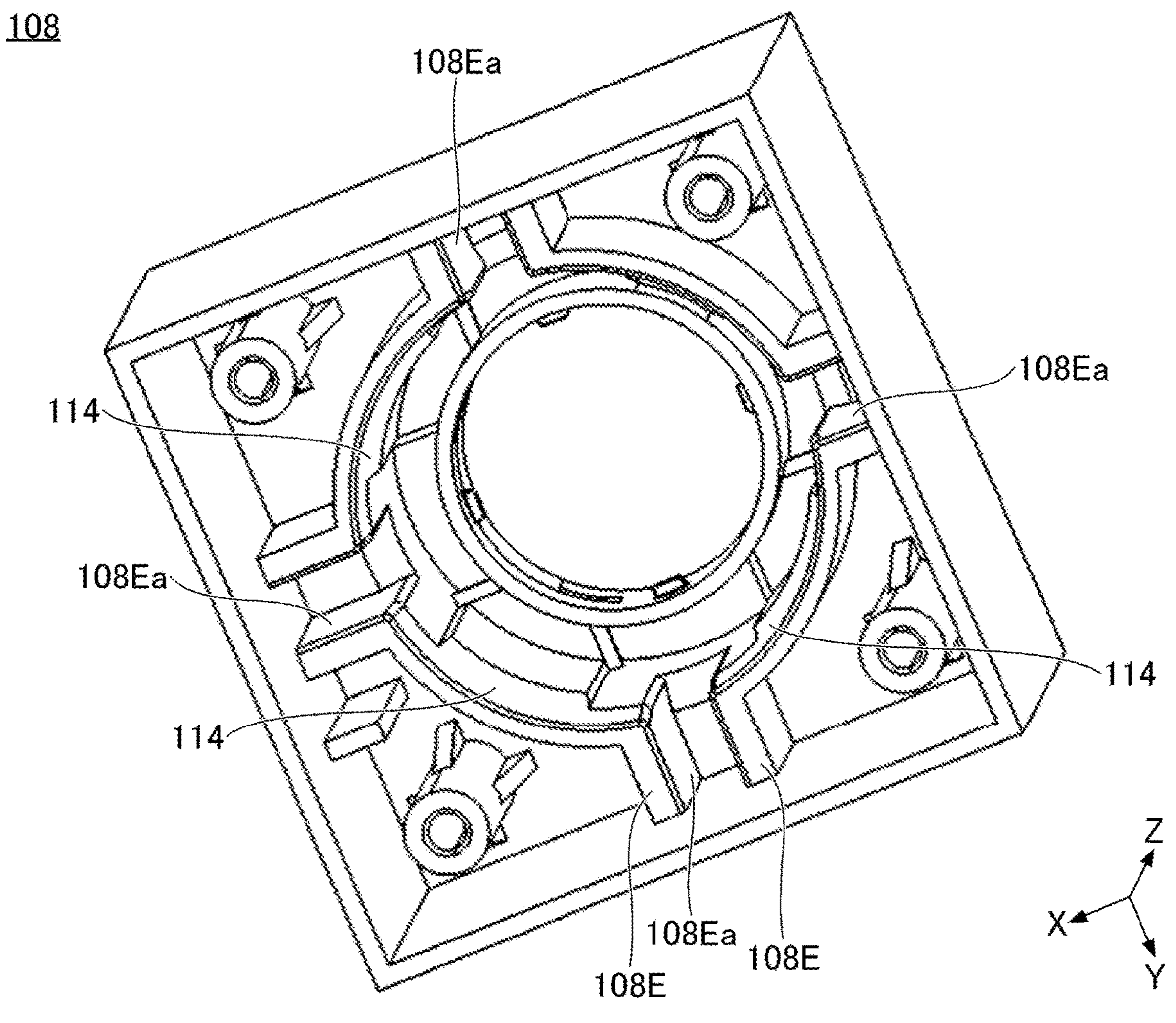
FIG. 19 is a perspective view of the housing included in the composite input device according to the embodiment.
Figure 20A:
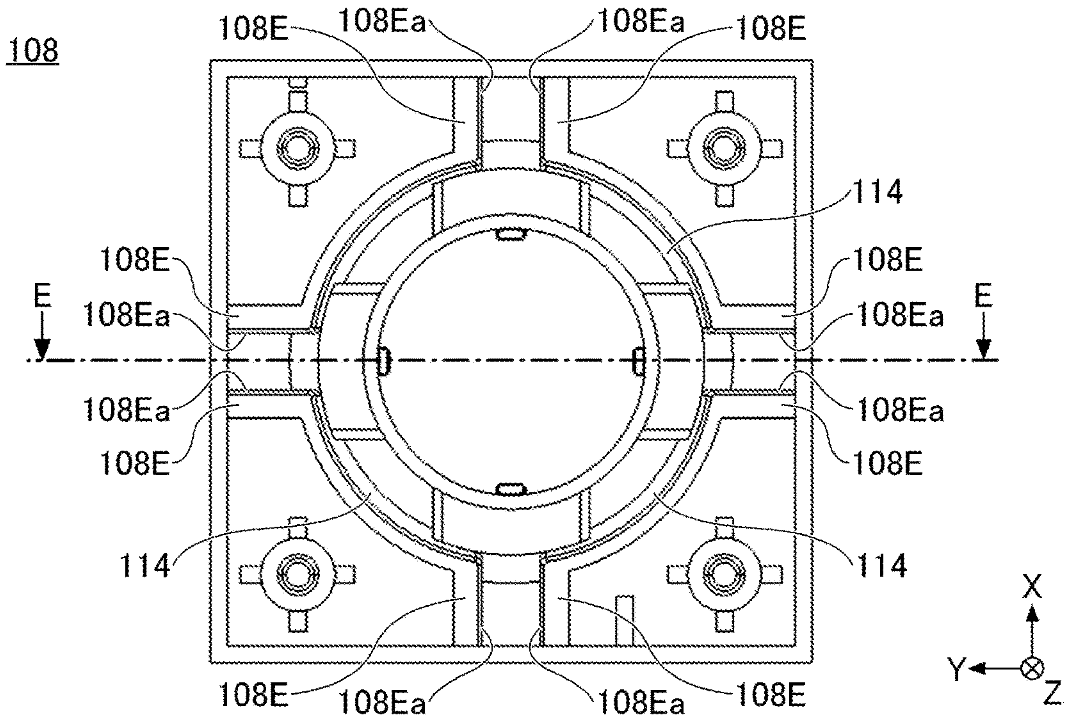
FIG. 20A is a bottom view of the housing included in the composite input device according to the embodiment.
Figure 20B:
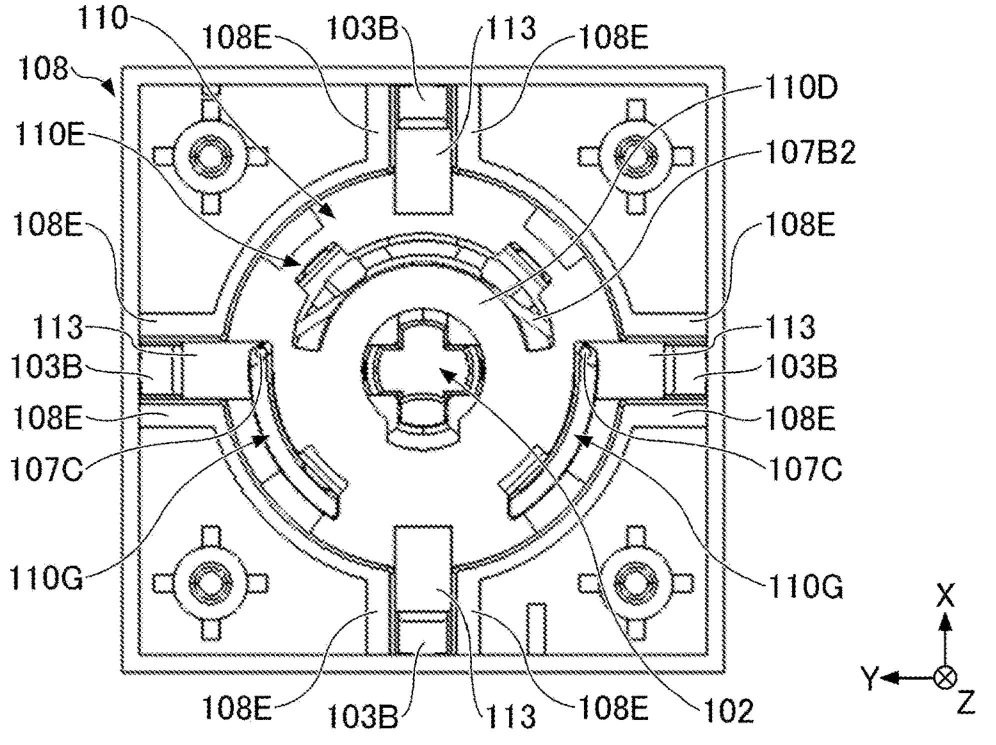
FIG. 20B is a bottom view of the configuration of the knob, a light guide, the holder, a torsion spring, the housing, and the actuator included in the composite input device according to the embodiment when the knob, a light guide, the holder, a torsion spring, the housing, and the actuator are assembled.
Figure 21:
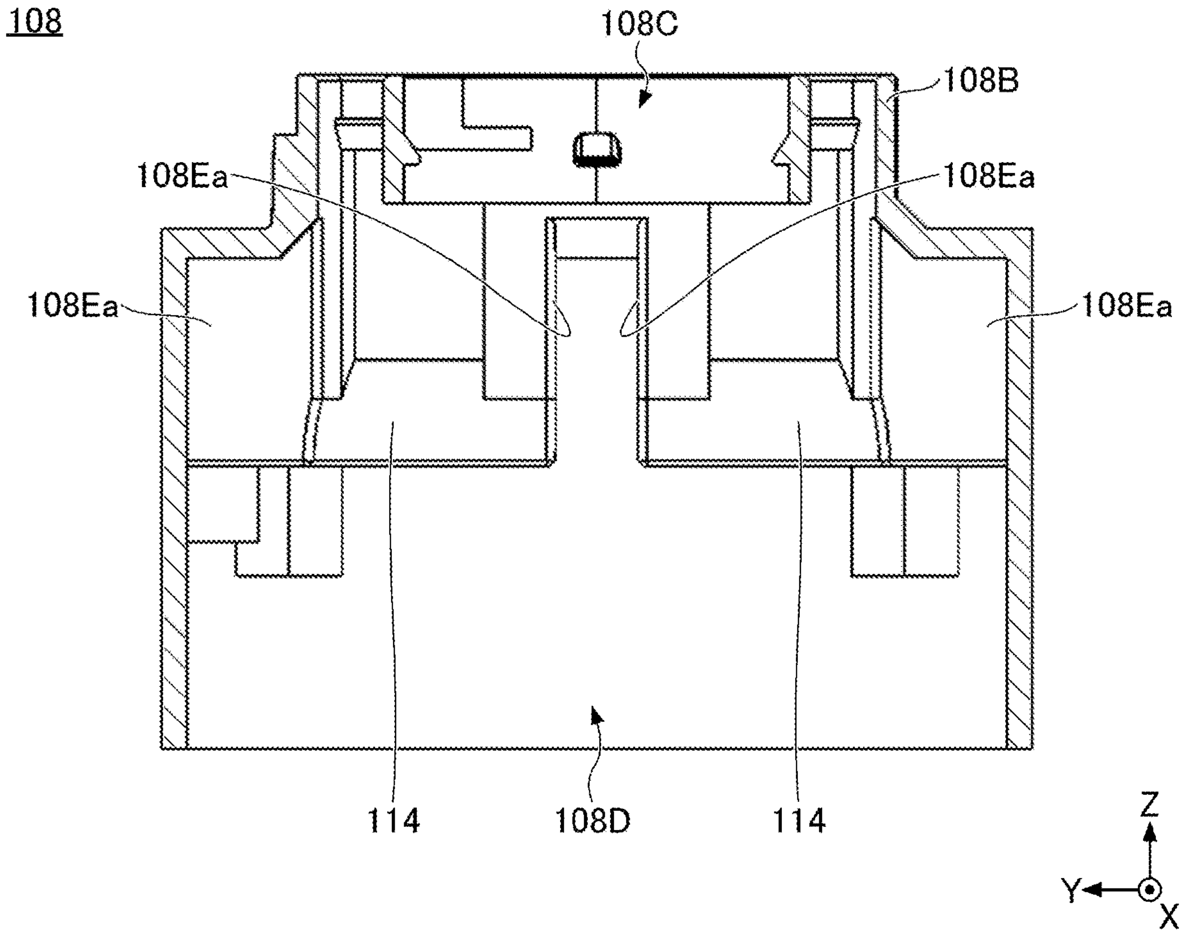
FIG. 21 is a side view of the housing included in the composite input device according to the embodiment taken along a line E-E indicated in FIG. 20.
Figure 22A:
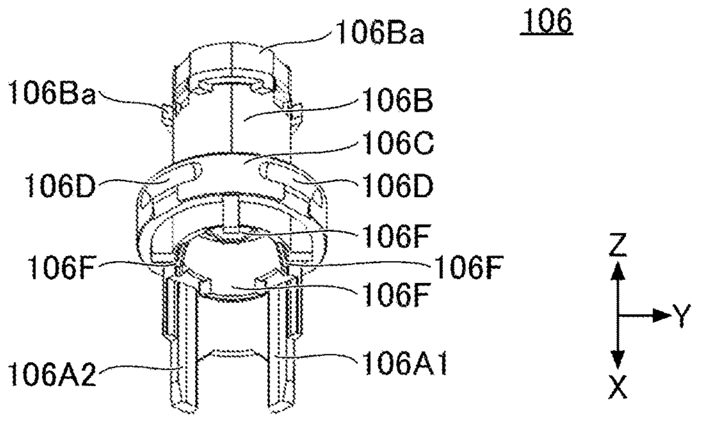
FIG. 22A is a perspective view of the holder included in the composite input device according to the embodiment.
Figure 22B:
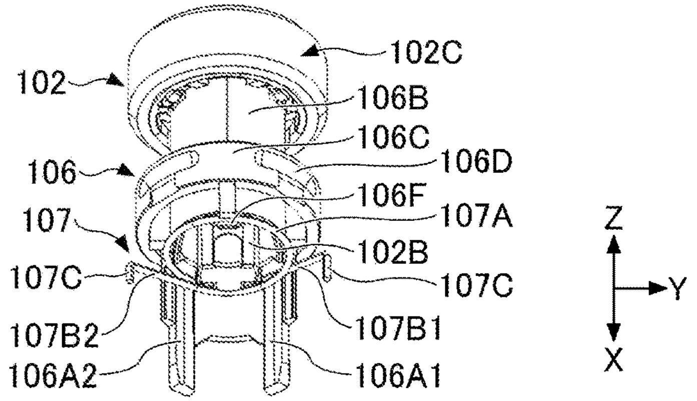
FIG. 22B is a perspective view of the configuration of the knob, the holder, and the torsion spring included in the composite input device according to the embodiment when the knob, the holder, and the torsion spring are assembled.
Figure 22C:
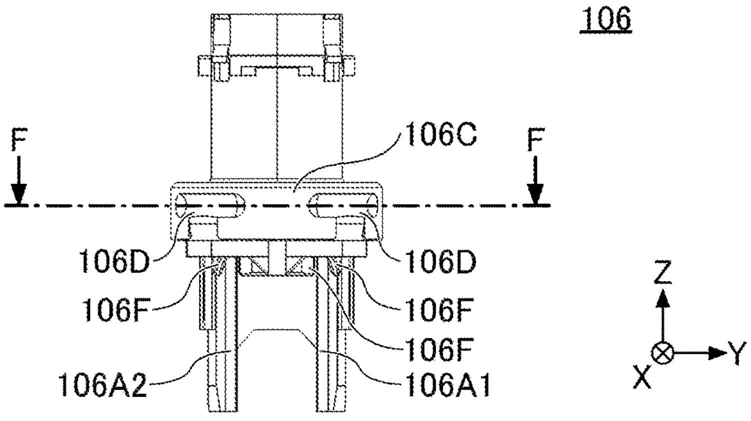
FIG. 22C is a side view of the holder included in the composite input device according to the embodiment.
Figure 22D:
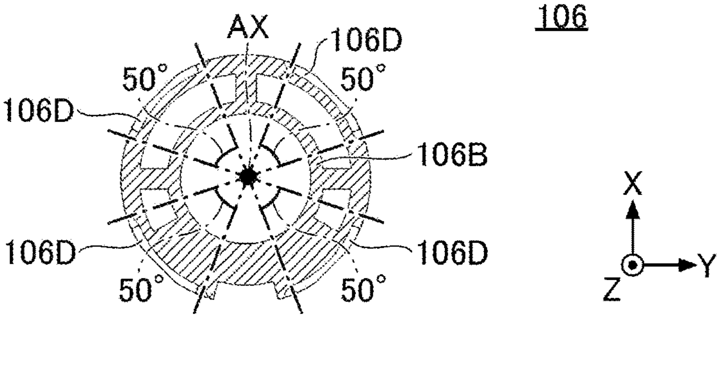
FIG. 22D is a cross-sectional view of the holder included in the composite input device according to the embodiment taken along a line F-F indicated in FIG. 22C.

FIG. 2 is an exploded perspective view of the composite input device 100 according to the embodiment. FIG. 3 is an outer perspective view of the composite input device 100 according to the embodiment without the illustration of the housing 108. FIG. 4 is a perspective view of a cross section of the composite input device 100 according to the embodiment. FIG. 13A is a perspective view of the knob 102 included in the composite input device 100 according to the embodiment. FIG. 13B is an exploded view of the knob 102 included in the composite input device 100 according to the embodiment FIG. 14 is a bottom view of the knob 102 included in the composite input device 100 according to the embodiment. FIG. 19 is a perspective view of the housing 108 included in the composite input device 100 according to the embodiment. FIGS. 20A and 20B each are a bottom view of the housing 108 included in the composite input device 100 according to the embodiment. FIG. 21 is a side view of the housing 108 included in the composite input device 100 according to the embodiment taken along a line E-E indicated in FIG. 20A. FIG. 22A is a perspective view of a holder 106 included in the composite input device 100 according to the embodiment. FIG. 22B is a perspective view of a configuration when the knob 102, the holder 106, and a torsion spring 107 included in the composite input device 100 according to the embodiment are been assembled. FIG. 22C is a side view of the holder 106 included in the composite input device 100 according to the embodiment. FIG. 22D is a cross-sectional view of the holder 106 included in the composite input device 100 according to the embodiment taken along a line F-F indicated in FIG. 22C.

As illustrated in FIG. 2, the composite input device 100 includes the knob 102, a cover 109, the housing 108, a light guide 103, the holder 106, the torsion spring 107, an actuator 110, a substrate 130, and a cover 104.

The knob 102 is a member that is operated by the operator and is made of synthetic resin. As illustrated in FIGS. 13A, 13B, and 14, the knob 102 includes the first operation portion 102A, a shaft portion 102B, and the second operation portion 102C. The first operation portion 102A and the shaft portion 102B are formed integrally. The first operation portion 102A and the second operation portion 102C are formed as separate parts. The first operation portion 102A and the second operation portion 102C are fitted to each other so as to be slidable relative to each other in the vertical direction and to be rotatable relative to each other about the rotational axis AX.

The first operation portion 102A is a member that receives the operating force of a pressing operation performed in the pressing direction D1 by the operator. The first operation portion 102A has a flat shape and a circular shape in a plan view from the +Z-axis direction. Also, the first operation portion 102A is a member that is illuminated by the light from an LED 134, which will be described in detail later.

The shaft portion 102B is a member extending downward (−Z-axis direction) from the center of the first operation portion 102A. The shaft portion 102B is inserted into a support shaft 111 of the actuator 110 and guides the first operation portion 102A and the shaft portion 102B to slide in the vertical direction. The shaft portion 102B includes slide guides 102Ba (to be described in detail later). Each slide guide 102Ba is provided in contact with a corresponding slide guide 111A of the actuator 110 (to be described in detail later). The sliding of the slide guides 102Ba of the knob 102 and the slide guides 111A of the actuator 110 allows the shaft portion 102B to be slidably supported in the vertical direction (Z-axis direction) by the actuator 110. A distal end portion 102Bc (an example of a "distal end portion") on the lower side of the shaft portion 102B is provided above a protrusion 131A of a press detection switch 131. The distal end portion 102Bc contacts and presses the protrusion 131A of the press detection switch 131 when a pressing operation is performed on the knob 102.

The first operation portion 102A of the knob 102 and the shaft portion 102B of the knob 102 are made of a synthetic resin material having a light transmitting property. The shaft portion 102B functions as a light guide. When light enters from a surface of incidence 102Bd (see FIGS. 5 and 13A) formed on the lower end portion of the knob 102, the knob 102 can guide the light to its upper end surface (that is, the first operation portion 102A).

As illustrated in FIGS. 13A and 13B, the shaft portion 102B of the knob 102 includes a light diffusion portion 102Be that is disposed in a position coupled to the first operation portion 102A. In this embodiment, the area of the first operation portion 102A, when viewed in a direction perpendicular to the substrate 130, is larger than the area of the shaft portion 102B. However, since the light diffusion portion 102Be is included between the first operation portion 102A and the shaft portion 1025, the light guided in the shaft portion 102B is diffused by the light diffusion portion 102Be and is subsequently guided to the first operation portion 102A. Hence, the light that enters from the surface of incidence 102Bd of the shaft portion 102B thoroughly illuminates the entire first operation portion 102A. The shape and the effect of the light diffusion portion 102Be of the knob 102 will be described later.

Display marks (not illustrated) may be displayed on the first operation portion 102A of the knob 102 to allow the operator to recognize the tilting directions D2 to D5 or the rotation directions D6 and D7 more easily. The display marks can be formed by a method such as printing or imprinting. Although the first operation portion 102A and the shaft portion 102B are formed integrally in this embodiment, the first operation portion 102A and the shaft portion 102B may also be formed as separate parts and be subsequently fitted to each other. For example, the first operation portion 102A can be decorated more easily when the first operation portion 102A and the shaft portion 102B are formed as separate parts.

Figure 11B:
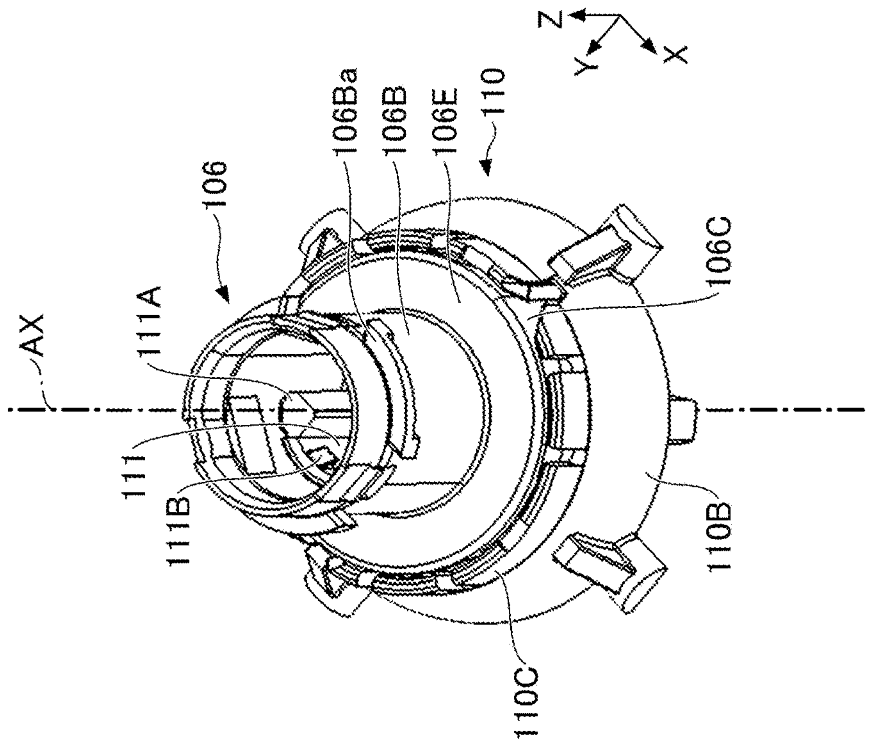
FIGS. 11A and 11B are views for explaining the fitting configuration of a holder and an actuator included in the composite input device according to the embodiment.
Figure 11A:
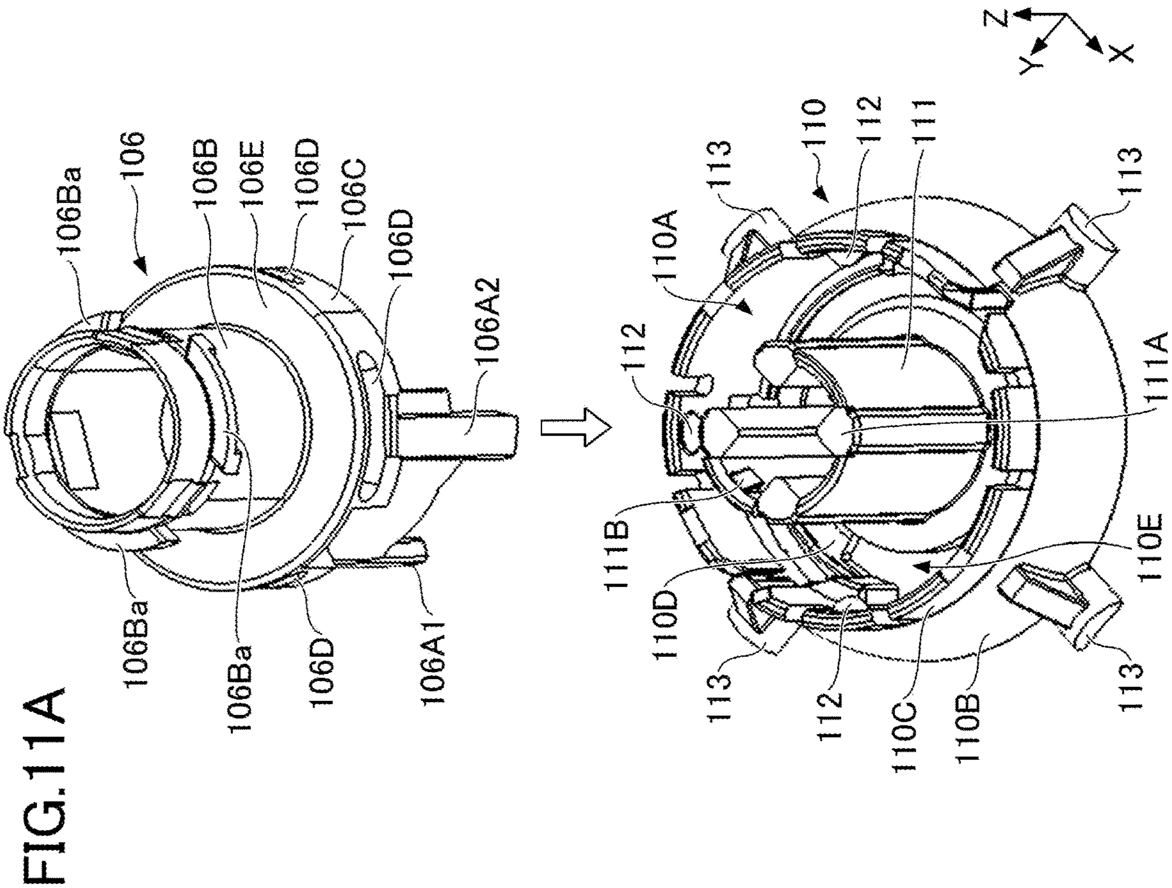

As illustrated in FIG. 13B, the second operation portion 102C of the knob 102 includes a grip portion 102Ca and a holder coupling portion 102Cb that is fixedly coupled to the grip portion 102Ca. The second operation portion 102C is a member that receives the operating forces of tilting operations performed in the tilting directions D2 to D5 and the operating forces of the rotating operations performed in the rotation directions D6 and D7 by the operator. The grip portion 102Ca is an annular part that surrounds the periphery of the first operation portion 102A, and is gripped by the operator during a tilting operation and a rotating operation. The holder coupling portion 102Cb is a member that is to be locked by coupling portions 106Ba provided on a first cylinder portion 106B of the holder 106, which is illustrated in FIG. 11A. In this embodiment, the grip portion 102Ca and the holder coupling portion 102Cb are formed as separate parts and then assembled, but they may be formed integrally.

The first operation portion 102A and the shaft portion 102B slide downward integrally when the operator applies an operating force on the first operation portion 102A in the pressing direction D1 (downward). At this time, the second operation portion 102C does not slide downward. More specifically, the first operation portion 102A and the second operation portion 102C are fitted to each other such that they can slide relative to each other in the vertical direction. In addition, the holder coupling portion 102Cb of the second operation portion 102C is coupled to the holder 106. The holder 106 is configured to rotate about the rotational axis AX but to be hindered from sliding in the vertical direction. Thus, the second operation portion 102C coupled to the holder 106 rotates together with the holder 106, but is hindered from sliding in the vertical direction, Hence, when the operator applies an operating force onto the first operation portion 102A in the pressing direction D1 (downward), the first operation portion 102A slides in the pressing direction D1, but the second operation portion 102C does not slide downward.

When the operator applies an operating force on the second operation portion 102C in one of the tilting directions D2 to D5, the first operation portion 102A and the second operation portion 102C tilt together.

The second operation portion 102C rotates when the operator applies an operating force on the second operation portion 102C in one of the rotation directions D6 and D7.

Furthermore, the operating force is transmitted to the holder 106 coupled to the holder coupling portion 102Cb, thus rotating the holder 106. At this time, the second operation portion 102C rotates, but the first operation portion 102A does not rotate because the rotation of the first operation portion 102A is restricted by the slide guides 102Ba that are in contact with the slide guides 111A of the actuator 110.

A surface treatment or the like for increasing decorative properties may be performed on a part of or the entire surface of the second operation portion 102C. The second operation portion 102C may be configured to be detachable from the first operation portion 102A. That is, the composite input device 100 may be configured to allow a user to replace the second operation portion 102C by selecting one second operation portion 102C from a plurality of second operation portions 102C with different decorative designs.

As illustrated in FIGS. 1 and 2 and in FIGS. 19 to 21, the housing 108 is a container-shaped member with a hollow structure, and the outer shape of the housing 108 is a rectangular cuboid. The housing 108 is member made of synthetic resin. The housing 108 accommodates the shaft portion 102B of the knob 102, the light guide 103, the holder 106, the torsion spring 107, the actuator 110, and the substrate 130. A pedestal portion 108B of a uniform height is formed on the center of an upper surface 108A of the housing 108. A circular opening 108C centered on the rotational axis AX in a plan view is formed on the pedestal portion 108B. The support shaft 111 of the knob 102 and the first cylinder portion 106B of the holder 106 are inserted in the opening 108C of the housing 108. The annular cover 109 that covers the upper surface and the outer peripheral surface of the pedestal portion 108B is attached to the pedestal portion 108B. A circular opening 109A centered on the rotational axis AX in a plan view is formed on the cover 109. The cover 109 is a member that includes a body molded from a white synthetic resin having a light transmitting property. The upper surface and the side surface of the molded body of the cover 109 is covered with a film coating. The cover 109 also includes an illumination display portion (illustration omitted in the drawings) that has been formed by removing a part of the film coating by laser machining.

The illumination display portion includes arrow shapes that indicate the tilting directions D2 to D5 illustrated in FIG. 1. Note that the illumination display portion may also have a shape that indicates the rotation directions D6 and D7. The housing 108 includes supporting surfaces 114 that are provided in contact with a first wall portion 1105 of the actuator 110. The supporting surfaces 114 support the actuator 110 so as to allow the actuator 110 to rotate. Each supporting surface 114 has a recessed spherical shape. The housing 108 includes guide surfaces 108Ea, which are provided in contact with pressing portions 113 of the actuator 110 (to be described in detail later), and guide walls 108E that include the guide surfaces 108Ea.

The light guide 103 is a member made of synthetic resin having a light transmitting property. The light guide 103 is disposed above the substrate 130. The light guide 103 guides the light beams emitted from four LEDs 135-1 to 135-4 provided on the upper surface 130A of the substrate 130, and emits the light beams from the back side of the cover 109 toward the illumination display portion, thereby lighting the illumination display portion of the cover 109. The light guide 103 includes an annular body portion 103A, which is disposed below the pedestal portion 108B, and four legs 103B. The four legs 103B are provided at 90° intervals with respect to the body portion 103A. The four legs 103B extends downward from the body portion 103A. The lower surface of each of the four legs 103B faces a corresponding one of the four LEDs 135-1 to 135-4, and serves as a plane of incidence through which the light from the corresponding one of the four LEDs 135-1 to 135-4 enters.

The holder 106 is a member configured to support the second operation portion 102C of the knob 102. The holder 106 is a member that transmit the operating force from a rotating operation. The holder 106 is a member made of synthetic resin. As illustrated in FIG. 11A, the holder 106 has an approximately cylindrical shape. By fitting each supporting rotation portion 112 of the actuator 110 to a corresponding supported rotation portion 106D formed in a second cylinder portion 106C (to be described in detail later), the holder 106 is rotatably supported by the actuator 110. The holder 106 is also supported by the actuator 110 by abutting protrusions 106F (to be described in detail later) against a base 110D of the actuator 110. The support shaft 111 of the actuator 110 is inserted inside the first cylinder portion 106B of the holder 106, and the first cylinder portion 106B abuts the support shaft Hence, the rotation of the holder 106 is guided by the support shaft 111 of the actuator 110. The coupling portions 106Ba provided on the first cylinder portion 106B of the holder 106 are locked by the second operation portion 102C of the knob 102. Hence, the holder 106 is configured to rotate with the second operation portion 102C of the knob 102 when the operator rotates the knob 102.

As illustrated in FIG. 22B, the torsion spring 107 includes a body portion 107A and an extending part 107B1, which extends from one end of the body portion 107A in a normal direction of a circle centered on the rotational axis AX. In addition, the torsion spring 107 includes an extending part 107B2, which extends from the other end of the body portion 107A in a normal direction of a circle centered on the rotational axis AX, and engaging portions 107C, each provided on the distal end of the corresponding one of the extending parts 107B1 and 107B2. The body portion 107A of the torsion spring 107 is a part wound into a coil, and is disposed around the protrusions 106F with the protrusions 106F of the holder 106 serving as a core. The extending part 107B1 of the torsion spring 107 contacts an arm 106A1 of the holder 106. The extending part 107B2 of the torsion spring 107 contacts an arm 106A2 of the holder 106. Each of two engaging portions 1070 of the torsion spring 107 is inserted into and is locked by a corresponding one of openings 110G of the actuator 110 illustrated in FIGS. 17 and 18. When the operator performs a rotating operation on the knob 102 in the rotation direction 56, the operating force thereof is transmitted to the holder 106 via a holder coupling portion 102Cb of the knob 102, thus rotating the holder 106 clockwise. When the holder 106 rotates clockwise, the arm 106A1 of the holder 106 presses the extending part 107B1 of the torsion spring 107, thus causing the body portion 107A of the torsion spring 107 to elastically deform. When released from the operating force from the rotation operation in the rotation direction D6, the extending part 107B1 of the torsion spring 107 presses the arm 106A1 of the holder 106 in a direction in which the holder 106 returns to the neutral position based on the restoring force from the body portion 107A of the torsion spring 107. When the restoring force is transmitted from the extending part 10751 of the torsion spring 107, the holder 106 rotates counterclockwise and returns to the neutral position. When the operator performs a rotating operation on the knob 102 in the rotation direction D7, the operating force thereof is transmitted to the holder 106 via the holder coupling portion 102Cb of the knob 102, thus rotating the holder 106 counterclockwise. When the holder 106 rotates counterclockwise, the arm 106A2 of the holder 106 presses the extending part 10752 of the torsion spring 107, thus causing the body portion 107A of the torsion spring 107 to elastically deform. When released from the operating force from the rotation operation in the rotation direction D7, the extending part 10752 of the torsion spring 107 presses the arm 106A2 of the holder 106 in a direction in which the holder 106 returns to the neutral position based on the restoring force from the body portion 107A of the torsion spring 107.

Figure 16:
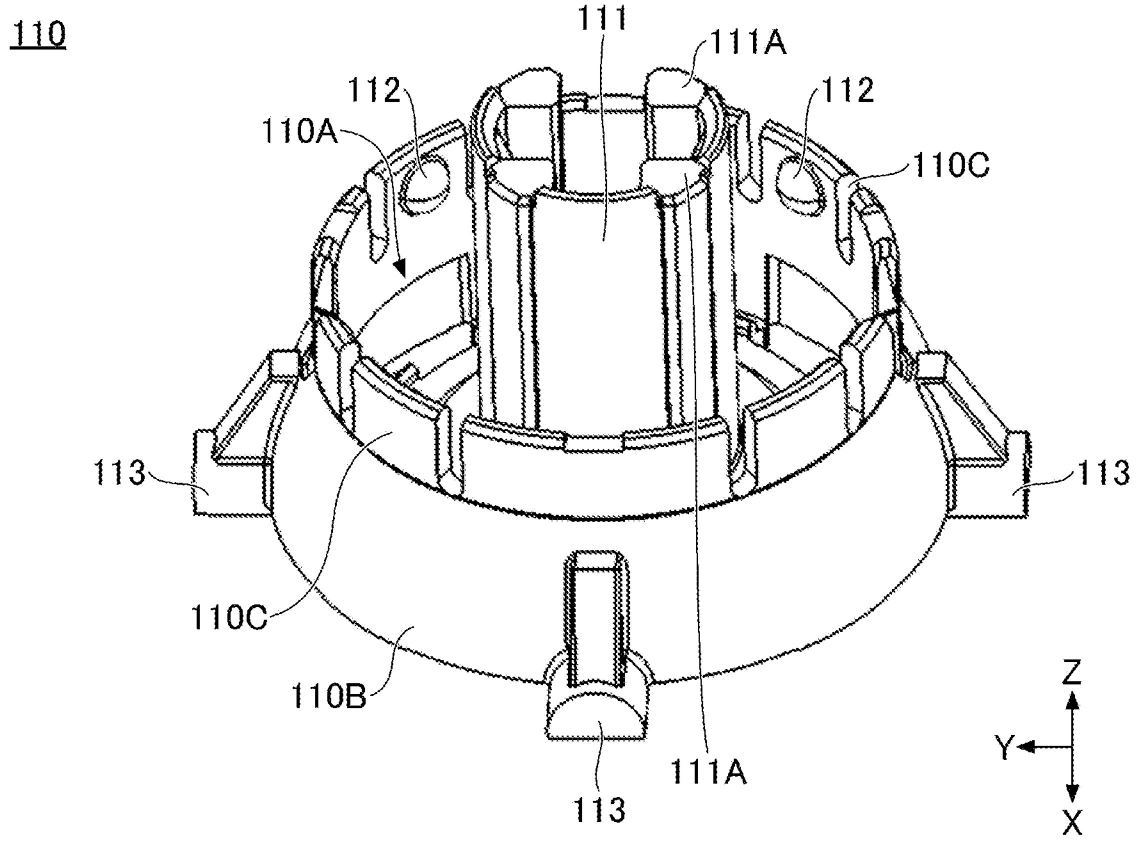
FIG. 16 is a perspective view of the holder included in the composite input device according to the embodiment.
Figure 17:
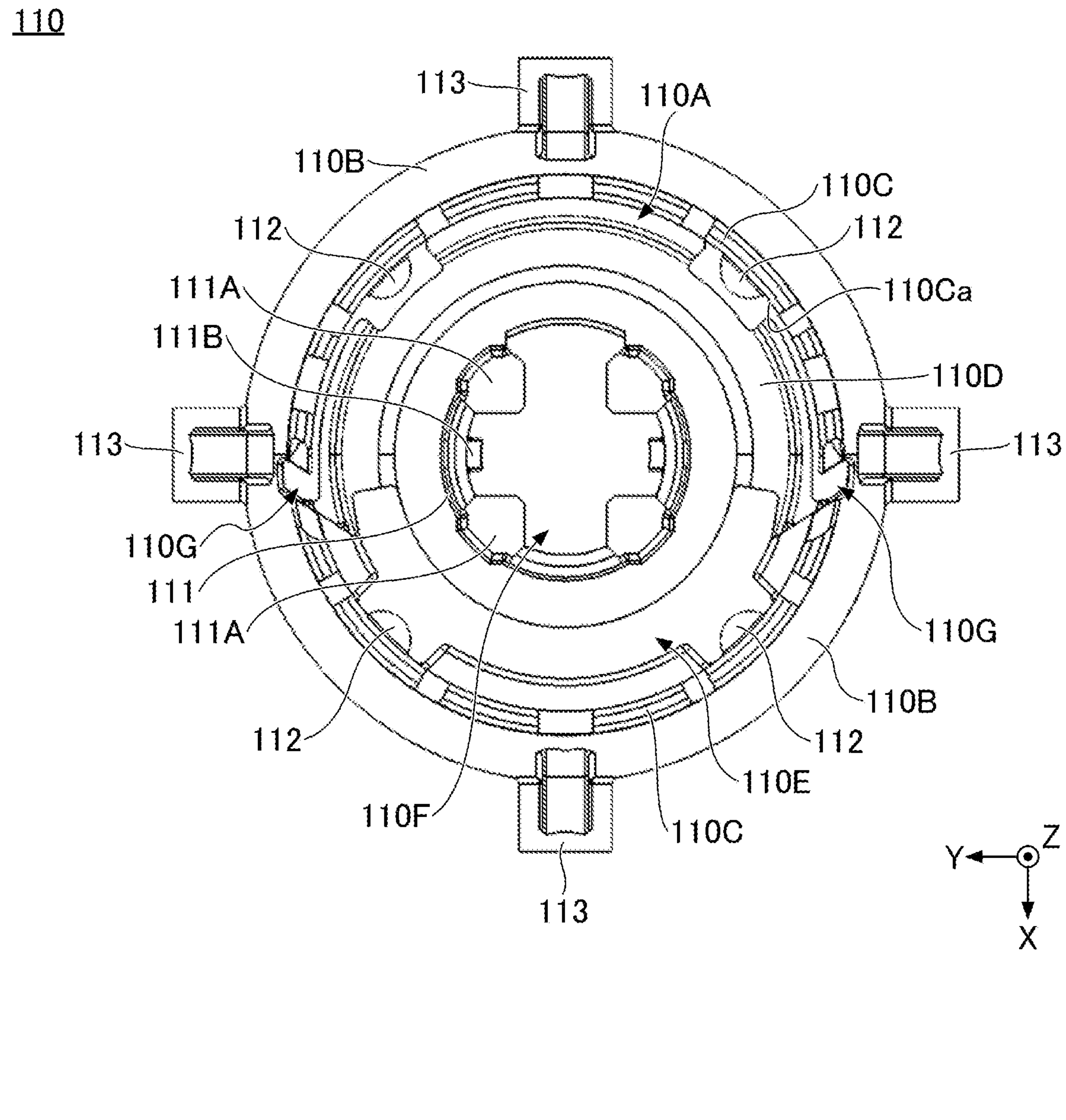
FIG. 17 is a top view of the holder included in a composite input device according to an embodiment.
Figure 18:
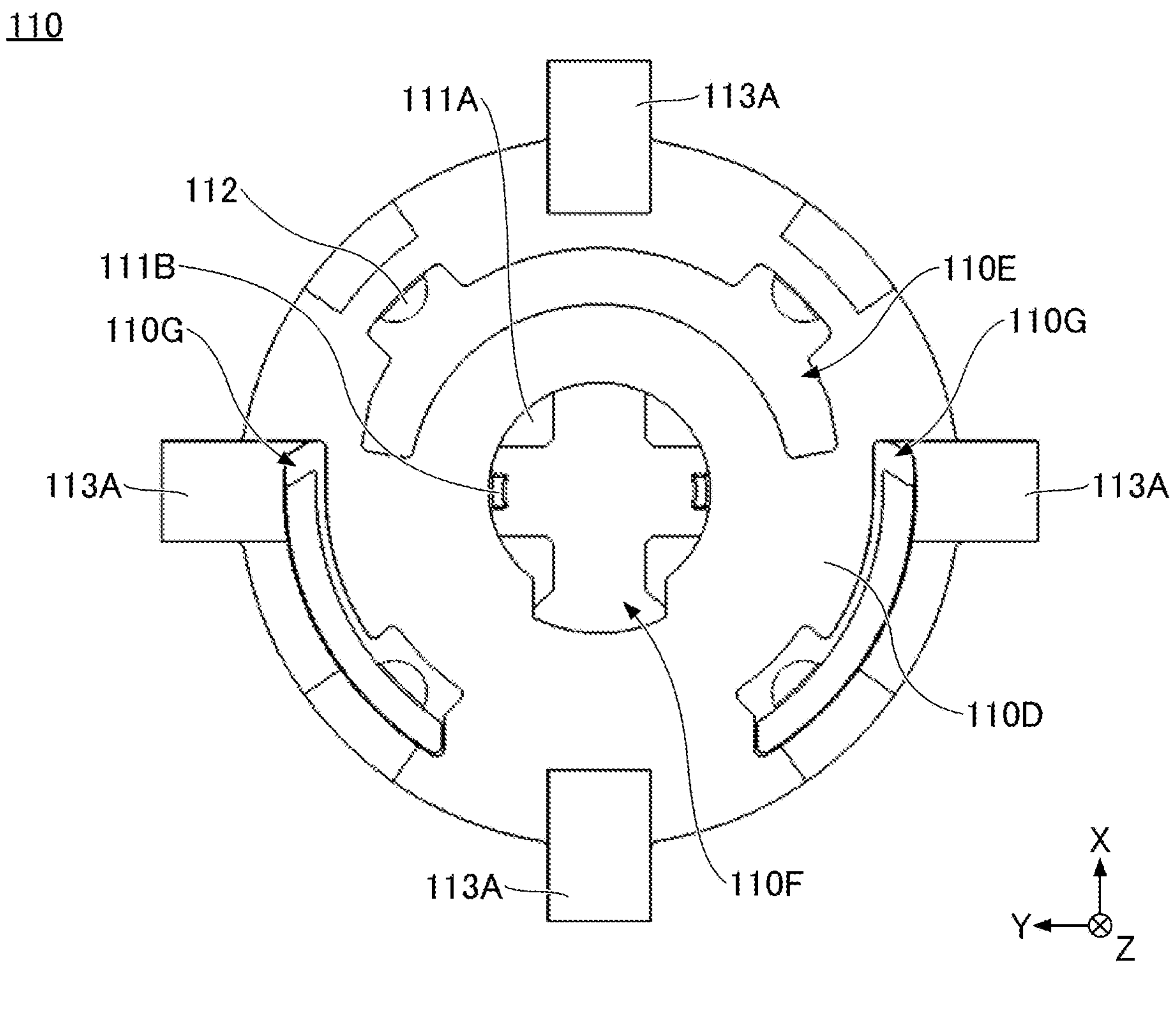
FIG. 18 is a bottom view of the holder included in the composite input device according to the embodiment.

As illustrated in FIGS. 16 to 18, actuator 110 includes the annular base 110D and the support shaft 111 that extends upward from the center of the base 110D and has an approximately cylindrical shape. The support shaft 111 is a part where the shaft portion 102B of the knob 102 is inserted and disposed. The support shaft 111 holds the shaft portion 102B of the knob 102 so that the shaft portion 102B of the knob 102 can slide the vertical direction.

The actuator 110 includes the first wall portion 110B that extends upward from the outer peripheral portion of the base 110D. The first wall portion 110B has a shape obtained by cutting out a portion of a spherical shape. The first wall portion 110B of the actuator 110 is disposed in contact with the supporting surfaces 114 of the housing 108. Hence, the actuator 110 is rotatably guided about the center of the spherical shape. As a result, when the operator performs a tilting operation on the knob 102, the actuator 110 rotates about the center of the spherical shape.

The actuator 110 includes a second wall portion 110C that extends upward from the upper end of the first wall portion 110B. The second wall portion 110C has an approximately cylindrical shape. The second wall portion 110C of the actuator 110 is a part where the holder 106 is inserted, and is a part disposed to face the outer peripheral surface of the second cylinder portion 106C of the holder 106. The actuator 110 includes the supporting rotation portions 112 that protrude from the second wall portion 110C toward the second cylinder portion 106C of the holder 106. The supporting rotation portions 112 are fitted to the supported rotation portions 106D of the holder 106, thus allowing the actuator 110 to rotatably support the holder 106. The actuator 110 is a member made of resin.

The actuator 110 also includes the four pressing portions 113 that protrude from the first wall portion 1105 in four directions of front, rear, left, and right. The pressing portions 113 of the actuator 110 are parts that press tilt detection switches 132-1 to 132-4 when the knob 102 is tilted tilting directions D2 to D5 and the actuator 110 rotates about the center of the spherical shaped formed by the first wall portion 1105. Each pressing portion 113 of the actuator 110 is shaped like a stopper for restricting the rotation of the actuator 110 in the rotation directions D6 and D7 by abutting against the guide surfaces 108Ea of the housing 108. The four pressing portions 113 of the actuator 110 are provided above the tilt detection switches 132-1 to 132-4. The four pressing portions 113 are provided in contact with the tilt detection switches 132-1 to 132-4.

The tilt detection switches 132-1 to 132-4 that contact the pressing portions 113 press the actuator 110 upward. As a result, the pressed actuator 110 is urged against the supporting surfaces 114 of the housing 108 of the first wall portion 110B. As illustrated in FIG. 20B, each of the pressing portions 113 of the actuator 110 is provided in contact with a corresponding pair of the guide walls 108E of the housing 108. As illustrated in FIG. 20A, the housing 108 includes four pairs of two guide surfaces 108Ea that are disposed in opposition to each other. Each pressing portion 113 of the actuator 110 is disposed between the pair of opposing guide surfaces 108Ea and contacts the guide surfaces 108Ea. Hence, when an operating force in directions that causes the actuator 110 to rotate in the rotation directions D6 and D7 is transmitted to the actuator 110 due to the application of the operating force on the knob 102 by the operator, the actuator 110 does not rotate in the rotation directions D6 and D7. Note that when the operator applies an operating force for a tilting operation on the knob 102, the actuator 110 rotates about the center of the spherical shape formed by the first wall portion 110B. The pressing portions 113 of the actuator 110 presses the any one of the tilt detection switches 132-1 to 132-4. Note that the detailed configuration of the actuator 110 will be described later with reference to FIGS. 9 to 11.

Figure 8:
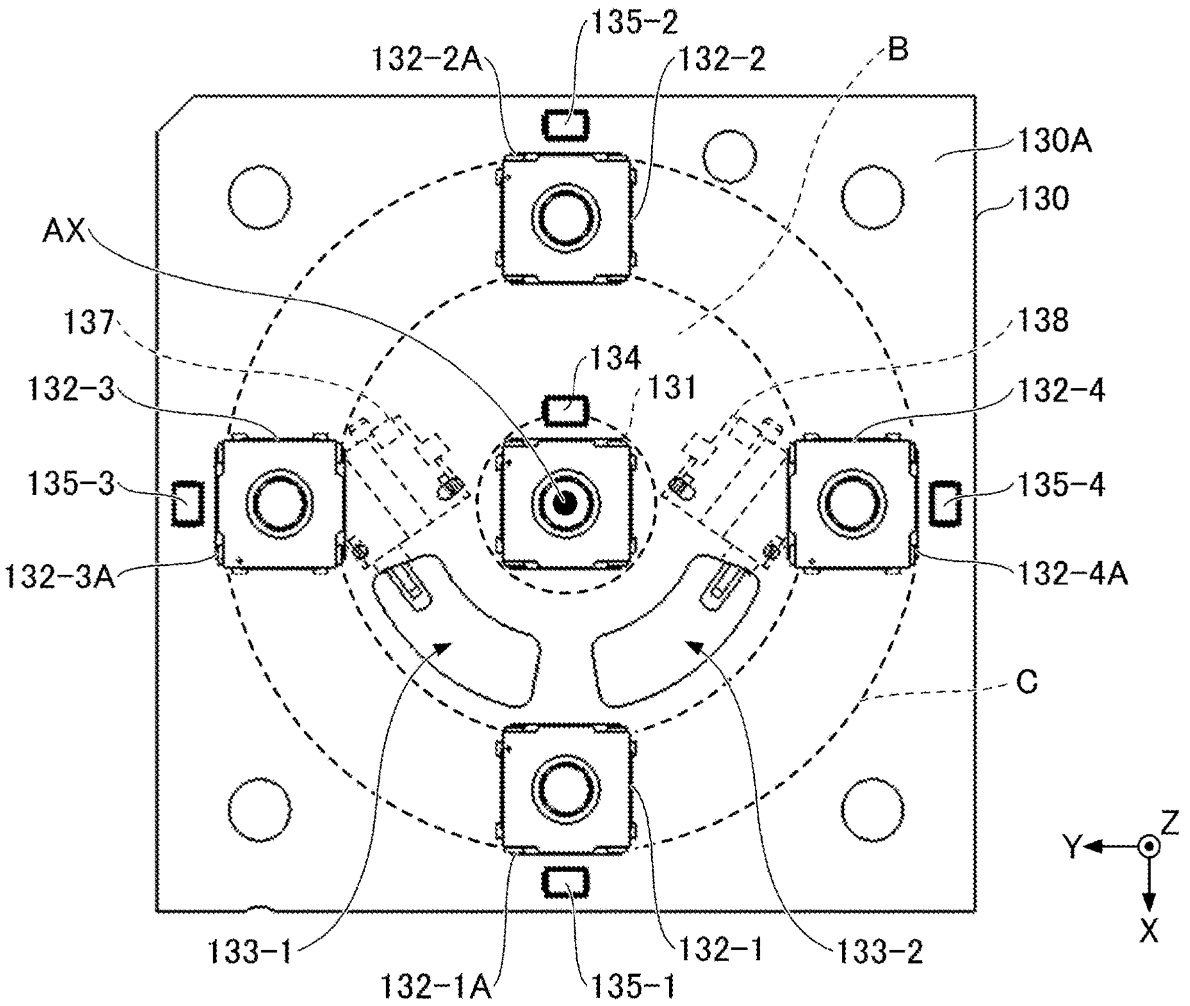
FIG. 8 is a plan view of a substrate included in the composite input device according to the embodiment.

The substrate 130 is a flat-plate member. The substrate 130 is preferably made of a hard synthetic resin and is preferably an epoxy substrate. The substrate 130 has a square shape in a plan view when viewed in a direction perpendicular to the substrate 130. The substrate 130 is disposed inside the housing 108 in a posture perpendicular to the rotational axis AX. The cover 104 is disposed below the substrate 130. The substrate 130 is fixed to the cover 104, and the substrate 130 is fixed to the cover 104 by any fixing method (for example, by a snap-fit engagement or screwing). The substrate 130 is provided with a wiring circuit made of a conductive material. Through holes 133-1 and 133-2 are provided in the substrate 130. Each of the through-holes 133-1 and 133-2 has an arc-shaped shape formed along a circumference whose center is an intersection with the rotational axis AX in a plan view from the direction perpendicular to the substrate 130. As illustrated in FIG. 8, when seen in a plan view in a direction perpendicular to the substrate 130, the through-holes 133-1 and 133-2 of the substrate 130 are arranged inside a circle C. The circle C has a center at an intersection of the rotational axis AX and the substrate 130 and has an outer circumference that passes through outer edges 132-1A, 132-2A, 132-3A, and 132-4A of the tilt detection switches 132-1 to 132-4 positioned farthest away from the center of the circle C. The circle C is an example of an "imaginary circle". Furthermore, when seen in a plan view in a direction perpendicular to the substrate 130, the through holes 133-1 and 133-2 of the substrate 130 are formed in an area B that is between the press detection switch 131 and the tilt detection switches 132-1 to 132-4.

As illustrated in FIG. 2, the press detection switch 131, the tilt detection switches 132-1 to 132-4, the LED 134, and the LEDs 135-1 to 135-4 are mounted on the upper surface 130A (an example of a "surface on one side") of the substrate 130. The press detection switch 131 is disposed at the center (on the rotational axis AX) of the upper surface 130A of the substrate 130. The press detection switch 131 is provided with a protrusion 131A that protrudes upward (in the ±Z-axis direction). Pressing the upper surface of the protrusion 131A switches on the press detection switch 131.

The tilt detection switches 132-1 to 132-4 each are an example of a "second detector". The tilt detection switch 132-1 is disposed closer to the front side (+X-axis side) than the press detection switch 131 is to the front side (+X-axis side). The tilt detection switch 132-2 is disposed closer to the rear side (−X-axis side) than the press detection switch 131 is to the rear side (−X-axis side). The tilt detection switch 132-3 is disposed closer to the right side (+Y-axis side) than the press detection switch 131 is to the right side (+Y-axis side). The tilt detection switch 132-4 is disposed closer to the right side (−Y-axis side) than the press detection switch 131 is to the right side (−Y-axis side). Each of the tilt detection switches 132-1 to 132-4 is provided with a protrusion 132A that protrudes upward (in the +Z-axis direction). Each of the tilt detection switches 132-1 to 132-4 is switched on when the upper surface of the corresponding protrusion 132A is pressed.

The cover 104 is a flat-plate member made of synthetic resin, and covers a lower opening 108D of the housing 108. The cover 104 is fixed to the housing 108 by any fixing method (for example, a snap-fit engagement or screwing) in a state where the cover 104 is covering the lower opening 108D of the housing 108.

(Configuration of Press Detection Mechanism)

Figure 5:
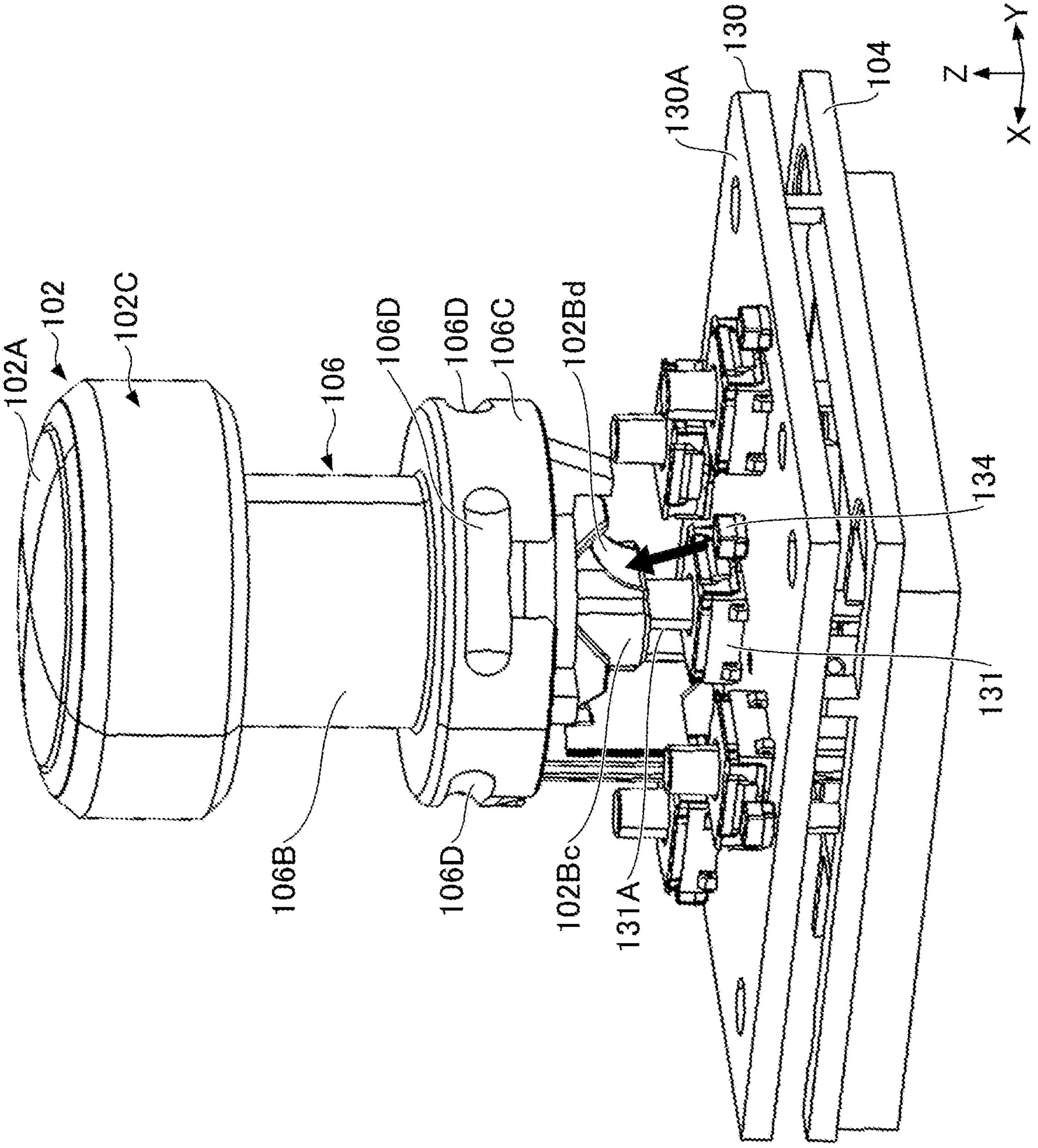
FIG. 5 is a view illustrating the configuration of a press detection mechanism included in the composite input device according to the embodiment.
Figure 15A:
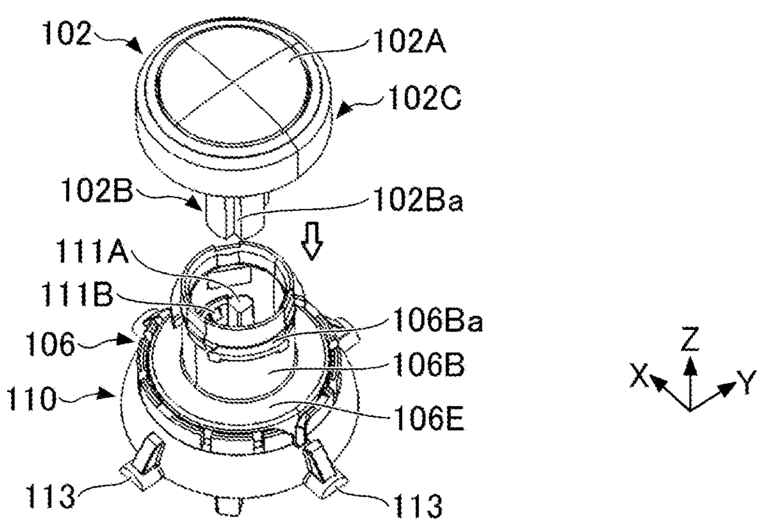
FIG. 15A is a view illustrating the assembly process of the knob, the holder, and the actuator included in the composite input device according to the embodiment.
Figure 15B:
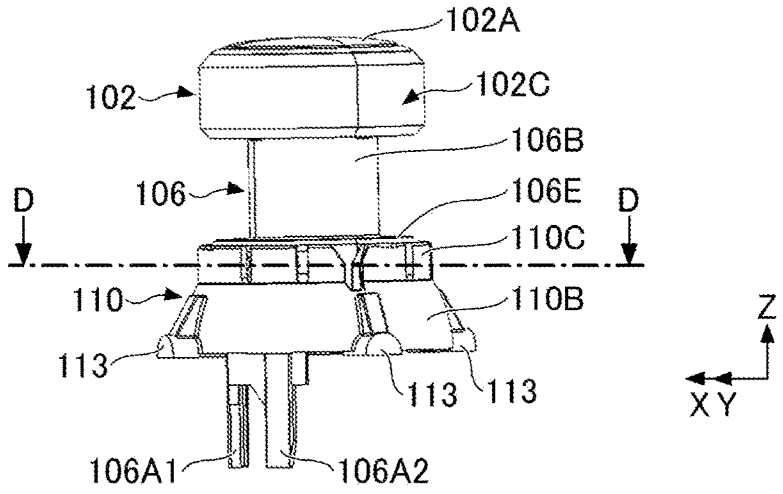
FIG. 15B is an upper perspective view of the configuration of the knob, the holder, and the actuator included in the composite input device according to the embodiment when the knob, the holder, and the actuator are assembled.
Figure 15C:
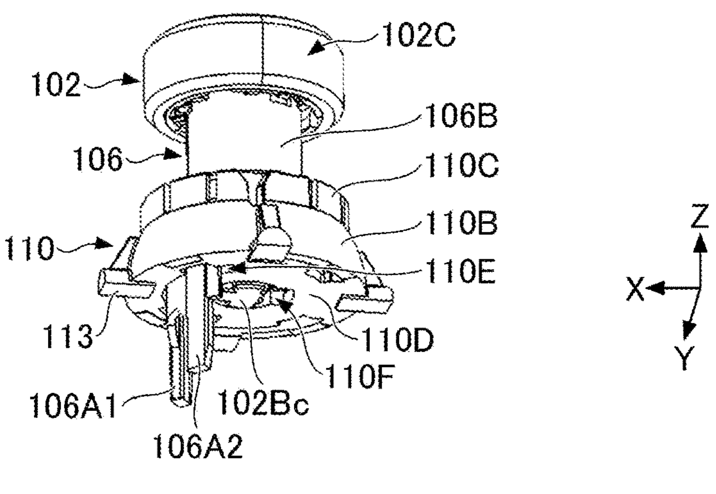
FIG. 15C is a lower perspective view of the configuration of the knob, the holder, and the actuator included in the composite input device according to the embodiment when the knob, the holder, and the actuator are assembled.

FIG. 5 is a view illustrating the configuration of a press detection mechanism included in the composite input device 100 according to the embodiment. FIG. 15A is a view for explaining the procedure for assembling the knob 102, the holder 106, and the actuator 110 included in the composite input device 100 according to the embodiment. FIG. 15B an upper perspective view illustrating the configuration of the knob 102, the holder 106, and the actuator 110 included in the composite input device 100 according to the embodiment when the knob 102, the holder 106, and the actuator 110 are assembled. FIG. 15C is a lower perspective view illustrating the configuration of the knob 102, the holder 106, and the actuator 110 included in the composite input device 100 according to the embodiment when the knob 102, the holder 106, and the actuator 110 are assembled.

As illustrated in FIG. 5, the distal end portion 102Bc on the lower side of the shaft portion 102B of the knob 102 contacts the protrusion 131A of the press detection switch 131 provided on the upper surface 130A of the substrate 130. The shaft portion 102B of the knob 102 is inserted in the support shaft 111 of the actuator 110 illustrated in FIG. 11A. As a result, the knob 102 is held slidably in the vertical direction (Z-axis direction). As illustrated in FIGS. 13A and 14, the outer shape of the shaft portion 102B of the knob 102 is a cylindrical shape that has the rotational axis AX as the central axis. The shaft portion 102B of the knob 102 includes grooves that extend in a vertical direction along the outer peripheral surface of the shaft portion 102B and are formed by the surfaces (the slide guides 102Ba) that intersect a circle centered on the rotational axis AX. Each slide guide 102Ba of the knob 102 is provided in contact with the corresponding slide guide 111A, which protrudes from the support shaft 111 of the actuators 110 toward the rotational axis AX as illustrated in FIG. 11A. The slide guides 111A of the actuator 110 and the slide guides 102Ba of the knob 102 are shaped to guide the sliding of the first operation portion 102A and the shaft portion 102B of the knob 102 in the vertical direction by sliding. The slide guides 102Ba of the knob 102 are shaped to restrict the rotation of the knob 102. The slide guides 102Ba of the knob 102 are arranged in directions that intersect the circle centered on the rotational axis AX. Hence, when the shaft portion 102B of the knob 102 attempts to rotate in the rotation direction D6 or the rotation direction D7, the slide guides 102Ba collide with the slide guide 111A of the actuator 110. As illustrated in FIGS. 13A and 14, the knob 102 includes abutment portions 102Bb that protrude from the shaft portion 102B in a direction away from the rotational axis AX in the X-Y plane direction. The abutment portions 102Bb and abutment portions 111B, which protrude from the actuator 110 as illustrated in FIGS. 11A and 11B, are shaped like stoppers that define the upper-end limit position of the stroke of a slide performed in the vertical direction of the knob 102. When a pressing operating force is not applied on the first operation portion 102A, the knob 102 pressed upward by the restoring force from the press detection switch 131, and the abutment portions 102Bb are urged against the abutment portions 111B of the actuator 110. As a result, the knob 102 is held by the press detection switch 131 and the actuator 110. Note that it is preferable for the abutment portions 102Bb of the knob 102 and the abutment portions 111E of the actuator 110 to have a snap-in shape. Providing the abutment portions 102Bb and the abutment portions 111B with a snap-in shape allows the knob 102 to be assembled in the form illustrated in FIGS. 15A and 15B, thereby facilitating the assembly of the knob 102. At this time, after the knob 102 is disposed above a configuration obtained by fitting the holder 106 to the actuator 110, the knob 102 is slid downward and joined to the configuration. As illustrated in FIG. 15C, the distal end portion 102Bc of the knob 102 here is inserted in an opening 110F that is provided at the center of the base 110D of the actuator 110.

When the operator is not performing a pressing operation on the knob 102, the protrusion 131A of the press detection switch 131 is in contact with the distal end portion 102Bc of the knob 102 as illustrated in FIG. 5. Here, the protrusion 131A of the press detection switch 131 is in a state where it is slightly pressed downward by the distal end portion 102Bc of the knob 102. Simultaneously, the protrusion 131A of the press detection switch 131 presses the distal end portion 102Bc of the knob 102 upward based on the restoring force of an elastic deformation member (illustration omitted) provided inside the press detection switch 131. Although the elastic deformation member slightly bends, it does not bend to a degree that will switch on the press detection switch 131. Hence, the press detection switch 131 is in an off state.

When the operator presses the knob 102 in the pressing direction D1 (downward), the knob 102 slides downward, and the distal end portion 102Bc of the shaft portion 102B of the knob 102 presses the protrusion 131A of the press detection switch 131. As a result, the press detection switch 131 is switched on. When released from the operating force of the pressing operation, the knob 102 returns to the neutral position based on the restoring force from the press detection switch 131.

Note that as illustrated in FIG. 5, the surface of incidence 102Bd is formed on the lower end portion (the part on the −X-axis side) of the shaft portion 102B of the knob 102. The surface of incidence 102Bd has a curved shape that is obtained by partially cutting the lower end portion. The surface of incidence 102Bd is disposed above the LED 134 provided on the upper surface 130A of the substrate 130 (that is, in a position closer to the −X-axis side than the press detection switch 131). The LED 134 is disposed in a position where the light emitted from the LED 134 will enter the surface of incidence 102Bd of the knob 102.

Note that the knob 102 is an example of a “third member”. In addition, the press detection switch 131 is an example of a “third contact”. When seen in a plan view in a direction perpendicular to the substrate 130, the press detection switch 131 is disposed in a position that overlaps with an intersection where the rotational axis AX and the substrate 130 meet. Furthermore, the configuration related to the pressing detection that includes the knob 102 and the press detection switch 131 is an example of a “third detector”. By including the “third detector”, the composite input device 100 according to the embodiment can detect that the pressing operation has been performed when the operator performs a pressing operation on the knob 102.

(Configuration of Rotation Detection Mechanism)

Figure 6:
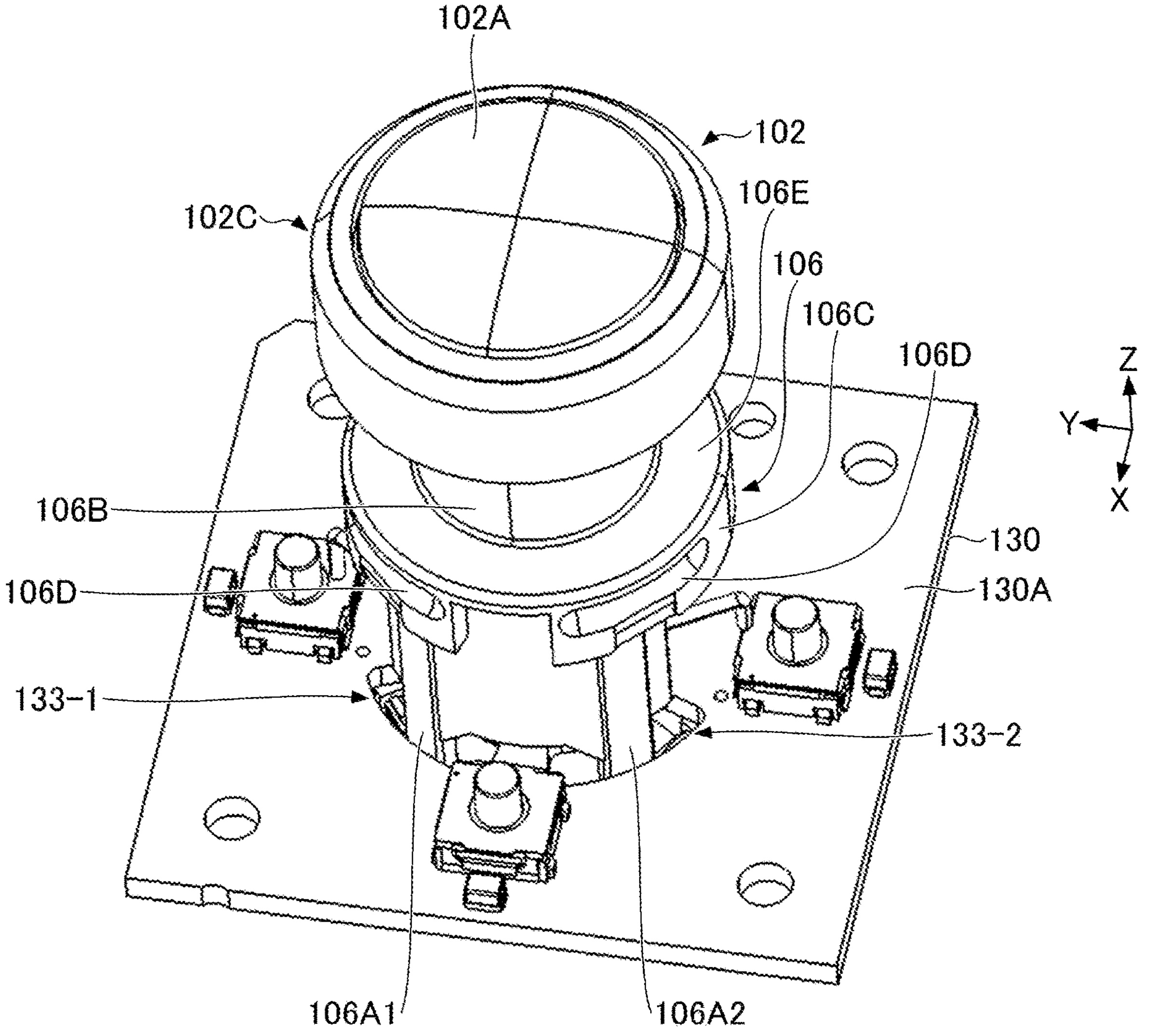
FIG. 6 is a view illustrating the configuration of a rotation detection mechanism included in the composite input device according to the embodiment.
Figure 7:
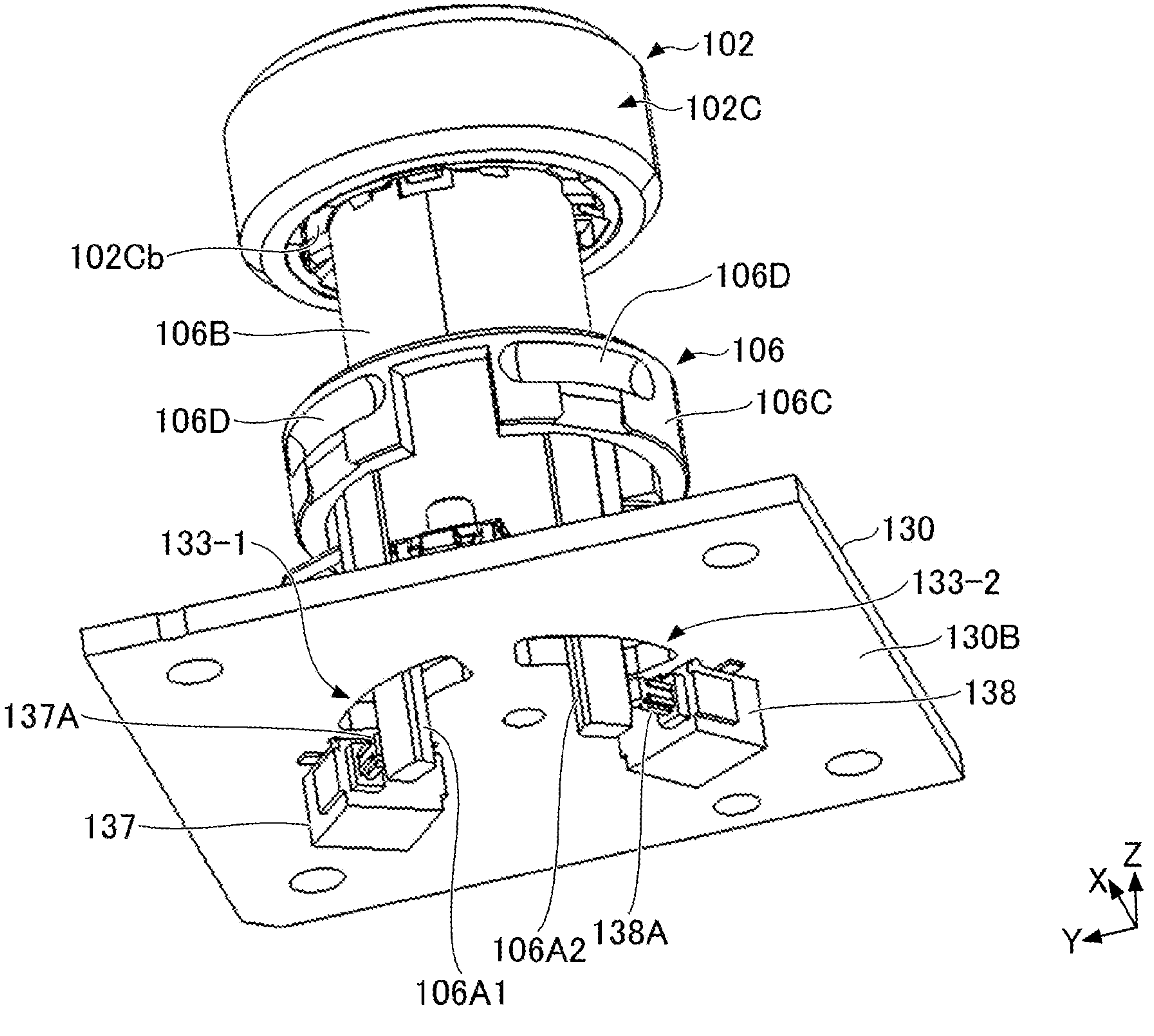
FIG. 7 is a view illustrating the configuration of the rotation detection mechanism included in the composite input device according to the embodiment.

FIGS. 6 and 7 are views illustrating the configuration of a rotation detection mechanism included in the composite input device 100 according to the embodiment. FIG. 6 illustrates the rotation detection mechanism when viewed from the side of the upper surface 130A of the substrate 130. FIG. 7 illustrates the rotation detection mechanism viewed when from the side of a lower surface 130B of the substrate 130. FIG. 16 is a perspective view of the holder 106 included in the composite input device 100 according to the embodiment. FIG. 17 is a top view of the holder 106 included in the composite input device 100 according to the embodiment. FIG. 18 is a top view of the holder 106 included in the composite input device 100 according to the embodiment. FIG. 19 is a perspective view of the housing 108 included in the composite input device 100 according to the embodiment. FIG. 20A is a bottom view of the housing 108 included in the composite input device 100 according to the embodiment. FIG. 20B is a bottom view of the configuration obtained when the knob 102, the light guide 103, the holder 106, the torsion spring 107, the housing 108, and the actuator 110 included in the composite input device 100 according to the embodiment are assembled.

As illustrated in FIGS. 6 and 7, the holder 106 is a member that is coupled to the knob 102 and rotates together with the knob 102 in accordance with the rotation operation performed on the knob 102. As illustrated in FIGS. 15A to 15C, the holder 106 is disposed between the knob 102 and the actuator 110. The supported rotation portions 106D (to be described in detail later) being supported by the supporting rotation portions 112 of the actuator 110 enables the holder 106 to be supported by the actuator 110.

In addition, as illustrated in FIGS. 6 and 7, the holder 106 includes the two arms 106A1 and 106A2 that extend downward (in the −Z-axis direction) from a base portion 106E (to be described in detail later). The arms 106A1 and 106A2 are formed integrally with the holder 106. The arms 106A1 and 106A2 rotate together with the holder 106 about the rotational axis AX when the holder 106 rotates. The arms 106A1 and 106A2 each are an example of an “insertable portion”.

As illustrated in FIG. 15C, the arms 106A1 and 106A2 are inserted in an opening 110E of the actuator 110.

As illustrated in FIGS. 6 and 7, the substrate 130 includes the through holes 133-1 and 133-2 that have an arc shape along a circumference centered on the intersection of the rotational axis AX and the substrate 130. The arm 106A1 of the holder 106 is inserted in the through hole 133-1.

When the holder 106 rotates about the rotational axis AX, the arm 106A1 of the holder 106 is able to move within the through hole 133-1 in the circumferential direction. The arm 106A2 of the holder 106 is inserted in the through hole 133-2. When the holder 106 rotates about the rotational axis AX, the arm 106A2 of the holder 106 is able to move within the through hole 133-2 in the circumferential direction. As illustrated in FIG. 8, when seen in a plan view from the direction perpendicular to the substrate 130, rotation detection switches 137 and 138 (first detectors) are arranged inside the circle C that has a center at an intersection of the rotational axis AX and the substrate 130 and has an outer circumference that passes through the outer edges of the tilt detection switches 132-1 to 132-4.

As illustrated in FIGS. 7 and 8, the two rotation detection switches 137 and 138 are provided on the lower surface 130B (an example of a "surface on the other side") of the substrate 130. The rotation detection switch 137 is disposed further outward on the substrate than the through hole 133-1 in the clockwise direction, and includes a projection 137A that protrudes toward the side surface of the distal end of the arm 106A1. The rotation detection switch 138 is disposed further outward on the substrate than the through hole 133-2 in the counterclockwise direction, and includes a projection 138A that protrudes toward the side surface of the distal end of the arm 106A2.

As illustrated in FIGS. 6 and 7, when the operating force from the rotation operation performed on the knob 102 is not applied, the lower end portions of the arm 106A1 and the arm 106A2 are positioned between the projection 137A of the rotation detection switch 137 and the projection 138A of the rotation detection switch 138. Hence, the rotation detection switches 137 and 138 are in an off state.

When a rotation operation in the clockwise direction of the knob 102 is performed, the holder 106, the arm 106A1, and the arm 106A2 rotate together with the knob 102 in the clockwise direction. This causes the side surface of the distal end portion of the arm 106A1 to press the projection 137A of the rotation detection switch 137 that is present in the direction of the rotation. As a result, the rotation detection switch 137 is switched on.

Conversely, when a rotation operation in the counterclockwise direction of the knob 102 is performed, the holder 106, the arm 106A1, and the arm 106A2 rotate together with the knob 102 in the counterclockwise direction. This causes the side surface of the distal end portion of the arm 106A2 to press the projection 138A of the rotation detection switch 138 that is present in the direction of the rotation. As a result, the rotation detection switch 138 is switched on.

Figure 10:
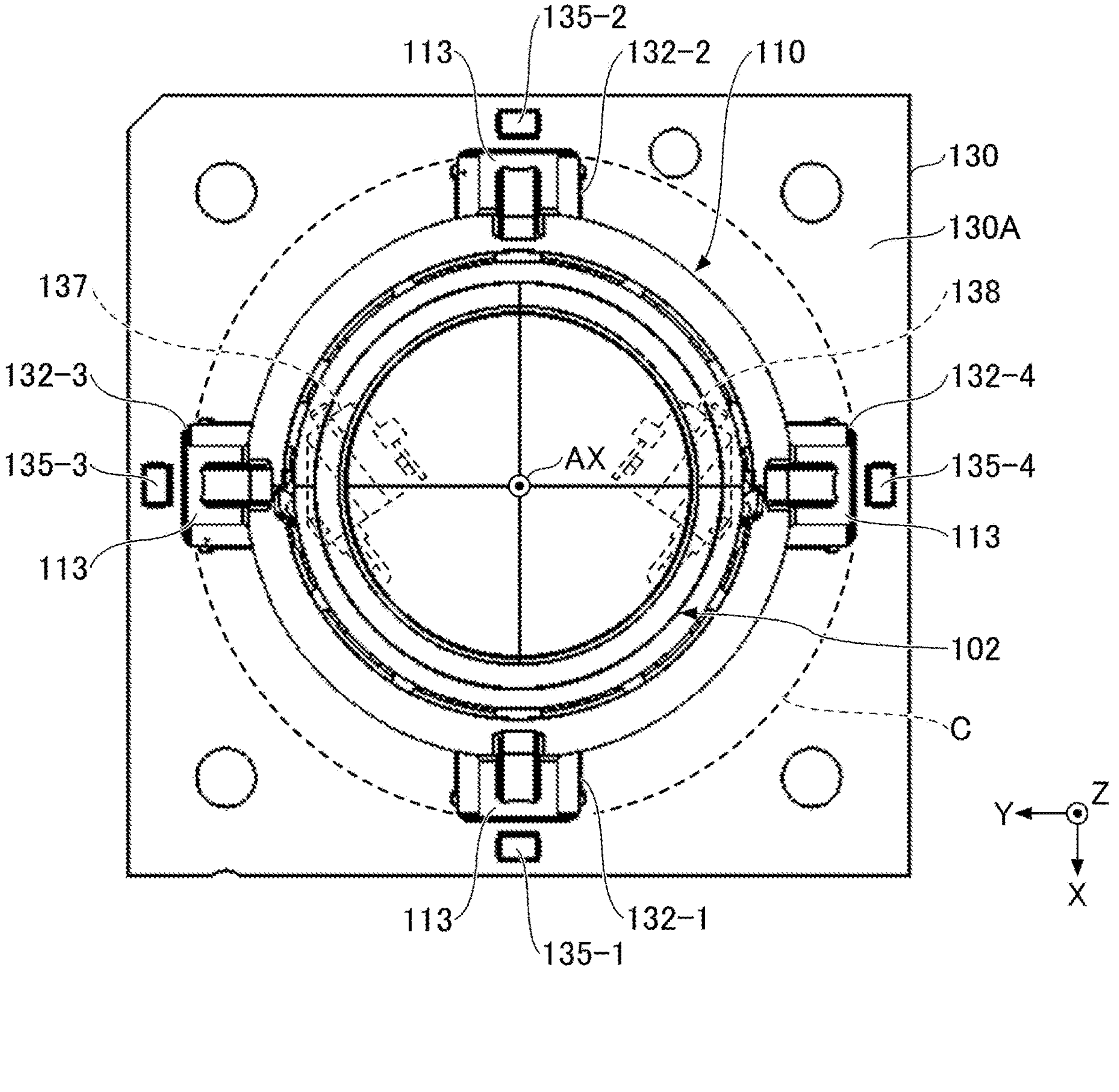
FIG. 10 is a plan view illustrating the configuration of the tilt detection mechanism included in the composite input device according to the embodiment.

Note that the holder 106 is an example of a "first member". In addition, the rotation detection switches 137 and 138 each are an example of a "first contact". Furthermore, the holder 106 and the rotation detection switches 137 and 138 form a "first detector". By including the "first detector", the composite input device 100 according to the embodiment is able to detect the rotation operation of the knob 102. As illustrated in FIG. 10, the holder 106 and the rotation detection switches 137 and 138 are arranged further inward on the substrate 130 than the circle C that has a center at the intersection of the rotational axis AX and the substrate 130 and has an outer circumference that passes through the outer edges of the tilt detection switches 132-1 to 132-4.

(Arrangement of Rotation Detection Switches 137 and 138)

FIG. 8 is a plan view of the substrate 130 included in the composite input device 100 according to the embodiment.

As illustrated in FIG. 8, in a plan view from the above, the rotation detection switches 137 and the rotation detection switch 138 are provided on the lower surface 130B of the substrate 130, and are arranged further inside of the substrate 130 than the tilt detection switches 132-1 to 132-4, which are provided on the upper surface 130A of the substrate 130. Hence, the composite input device 100 according to the embodiment can be implemented as a composite input device with a small equipment footprint.

Particularly, in the composite input device 100 according to the embodiment, the tilt detection switches 132-1 to 132-4 (second contacts) and the press detection switch 131 (third contact) are provided on the upper surface 130A of the substrate 130, and the rotation detection switches 137 and 138 (first contacts) are provided on the lower surface 130B of the substrate 130. As a result, in the composite input device 100 according to the embodiment, the rotation detection switches 137 and 138 can be disposed over the tilt detection switches 132-3 and the 132-4 in a plan view from above as illustrated in FIG. 8. Therefore, a composite input device that has a smaller equipment footprint can be implemented.

Also, as illustrated in FIG. 8, in a plan view from the above, the through holes 133-1 and 133-2 arranged in the substrate 130 are arranged further inside of substrate 130 than the tilt detection switches 132-1 to 132-4 provided on the upper surface 130A of the substrate 130. As a result, a composite input device that has a smaller equipment footprint can be implemented by the composite input device 100 according to the embodiment.

(Configuration of Tilt Detection Mechanism)

Figure 9:
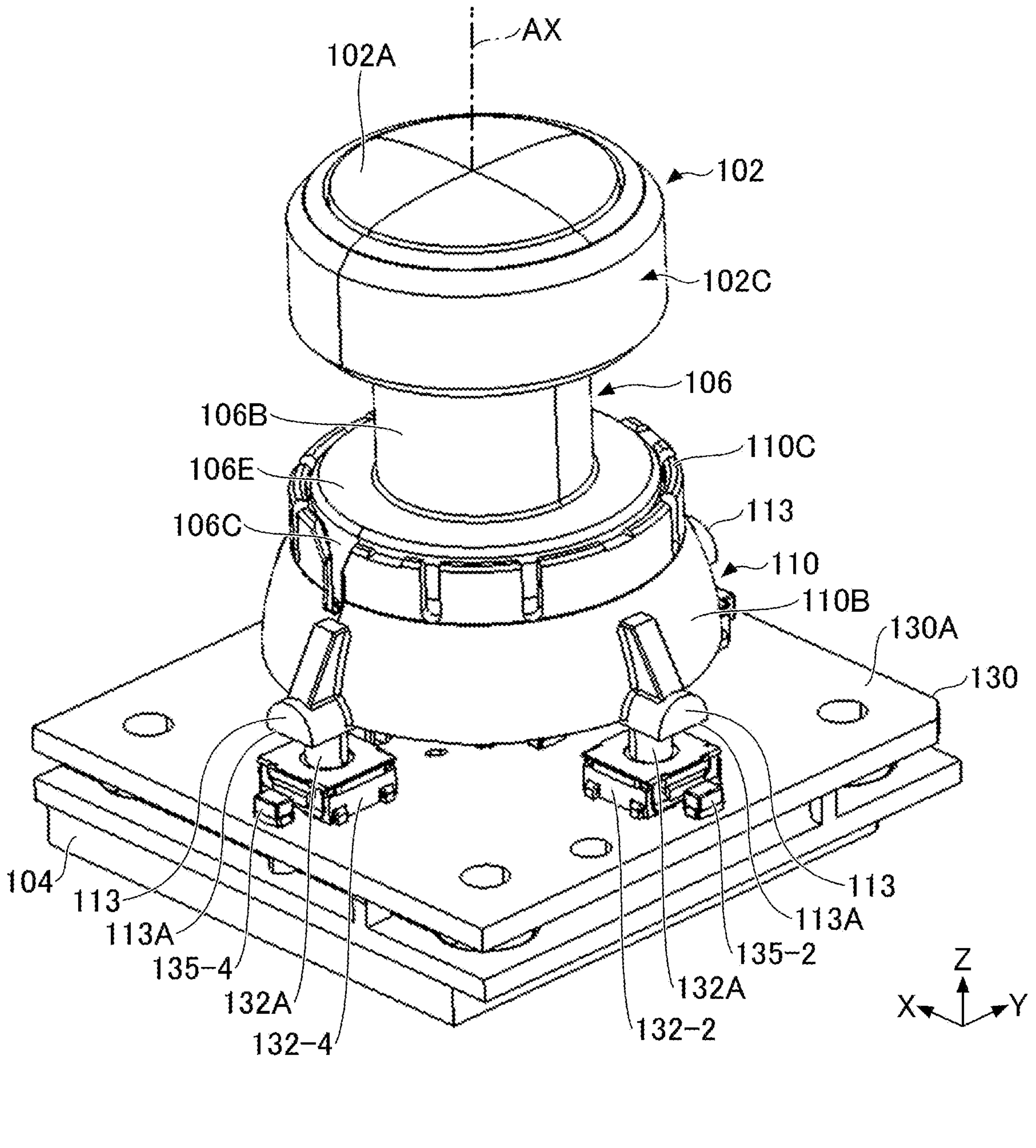
FIG. 9 is an outer perspective view illustrating the configuration of a tilt detection mechanism included in the composite input device according to the embodiment.

FIG. 9 is an outer perspective view illustrating the configuration of the tilt detection mechanism included in the composite input device 100 according to the embodiment. FIG. 10 is a plan view illustrating the tilt detection mechanism included in the composite input device 100 according to the embodiment.

The "tilt detection mechanism" included in the composite input device 100 includes the actuator 110 and the tilt detection switches 132-1 to 132-4.

As illustrated in FIGS. 9 and 10, the actuator 110 has, substantially, a cylindrical shape that is centered on the rotational axis AX and extends in a vertical direction (Z-axis direction) along the rotational axis AX. As illustrated in FIG. 9, the second cylinder portion 106C of the holder 106 is fitted inside the cylinder of the actuator 110. This allows the actuator 110 to tilt in the tilting operation direction with the knob 102 and the holder 106 in accordance with the tilting operation performed on the knob 102. Also, the four pressing portions 113, which are arranged at 90° intervals and protrude outward in the radial direction, are provided at the lower end of the outer peripheral surface of the actuator 110. Each pressing portion 113 has a shape obtained by dividing a cylinder by a vertical plane, and is disposed such that the resulting cross section with a plane shape faces downward.

In addition, as illustrated in FIGS. 9 and 10, each of tilt detection switches 132-1 to 132-4 is disposed, on the upper surface 130A of the substrate 130, in a position that faces the pressing surface 113A of the corresponding one of the four pressing portions 113 of the actuator 110.

(Operation of Tilt Detection Mechanism)

As illustrated in FIGS. 9 and 10, when a tilt operation is not performed on the knob 102, the actuator 110, together with the knob 102 and the holder 106, is in a vertically upright position. That is, the actuator 110 is a state with no tilt with respect to the rotational axis AX.

At this time, none of the respective protrusions 132A of the tilt detection switches 132-1 to 132-4 are pressed by the pressing portions 113 of the actuator 110. Hence, the tilt detection switches 132-1 to 132-4 are in an off state.

When a tilting operation is performed on the knob 102, the actuator 110 tilts, together with the knob 102 and the holder 106 in the direction of the tilting operation. That is, the actuator 110 is tilted with respect to the rotational axis AX.

At this time, protrusion 132A of one of the tilt detection switches 132-1 to 132-4 that is in the direction of the tilting operation is pressed by the pressing surface 113A of the corresponding one of the pressing portions 113 that is in the direction of the tilt operation. As a result, the one switch in the direction of the tilting operation is switched on.

Note that the actuator 110 is an example of a "second member". In addition, the tilt detection switches 132-1 to 132-4 each are an example of a "second contact". Furthermore, the actuator 110 and the tilt detection switches 132-1 to 132-4 form a "second detector". By including the "second detector", the composite input device 100 according to the embodiment is able to detect the tilt operation of the knob 102. When seen in a plan view in a direction perpendicular to the substrate 130, the tilt detection switches 132-1 to 132-4 are arranged at 90° intervals along a circumference centered on the intersection of the rotational axis AX and the substrate 130. The arrangement of the tilt detection switches 132-1 to 132-4 corresponds to the arrangement of the tilting directions D2 to D5 illustrated in FIG. 1.

(Fitting Configuration of Holder 106 and Actuator 110)

FIGS. 11A and 11B are views for explaining the fitting configuration of the holder 106 and the actuator 110 included in the composite input device 100 according to the embodiment.

As illustrated in FIGS. 11A, 11B, and 22A, the holder 106 includes the first cylinder portion 106B, the second cylinder portion 106C, the base portion 106E, and the protrusions 106F. The first cylinder portion 106B has a cylindrical shape that is centered on the rotational axis AX and extends in the vertical direction (Z-axis direction) along the rotational axis AX. The second cylinder portion 106C is provided integrally with the lower end portion of the first cylinder portion 106B, and has a cylindrical shape with a larger diameter than that of the first cylinder portion 106B centered on the rotational axis AX. The supported rotation portions 106D are formed on the outer peripheral surface of the second cylinder portion 106C. The base portion 106E is a part provided between the first cylinder portion 106B and the second cylinder portion 106C, and couples the first cylinder portion 106B to the second cylinder portion 106C. The base portion 106E has a plane shape parallel to the X-Y plane direction. The protrusions 106F are parts that protrude downward from the lower end of the first cylinder portion 106B and abut against the base 110D of the actuator 110. The protrusions 106F also serve as the core of the body portion 107A of the torsion spring 107.

As illustrated in FIGS. 16 to 18, the actuator 110 includes the annular base 110D that is provided in parallel to the X-Y plane, the first wall portion 110B that extends upward from the outer end of the base 110D, and the second wall portion 1100 that extends upward from the upper end of the first wall portion 110B. The actuator 110 includes the cylindrical support shaft 111 that is centered on the rotational axis AX and extends upward from the base 110D. The actuator 110 also includes the four pressing portions 113 that protrude from the first wall portion 110B in the front direction, the rear direction, the right direction, and the left direction, respectively. The pressing portions 113 of the actuator 110 are arranged above the tilt detection switches 132-1 to 132-4 and contact the tilt detection switches 132-1 to 132-4.

Figure 12:
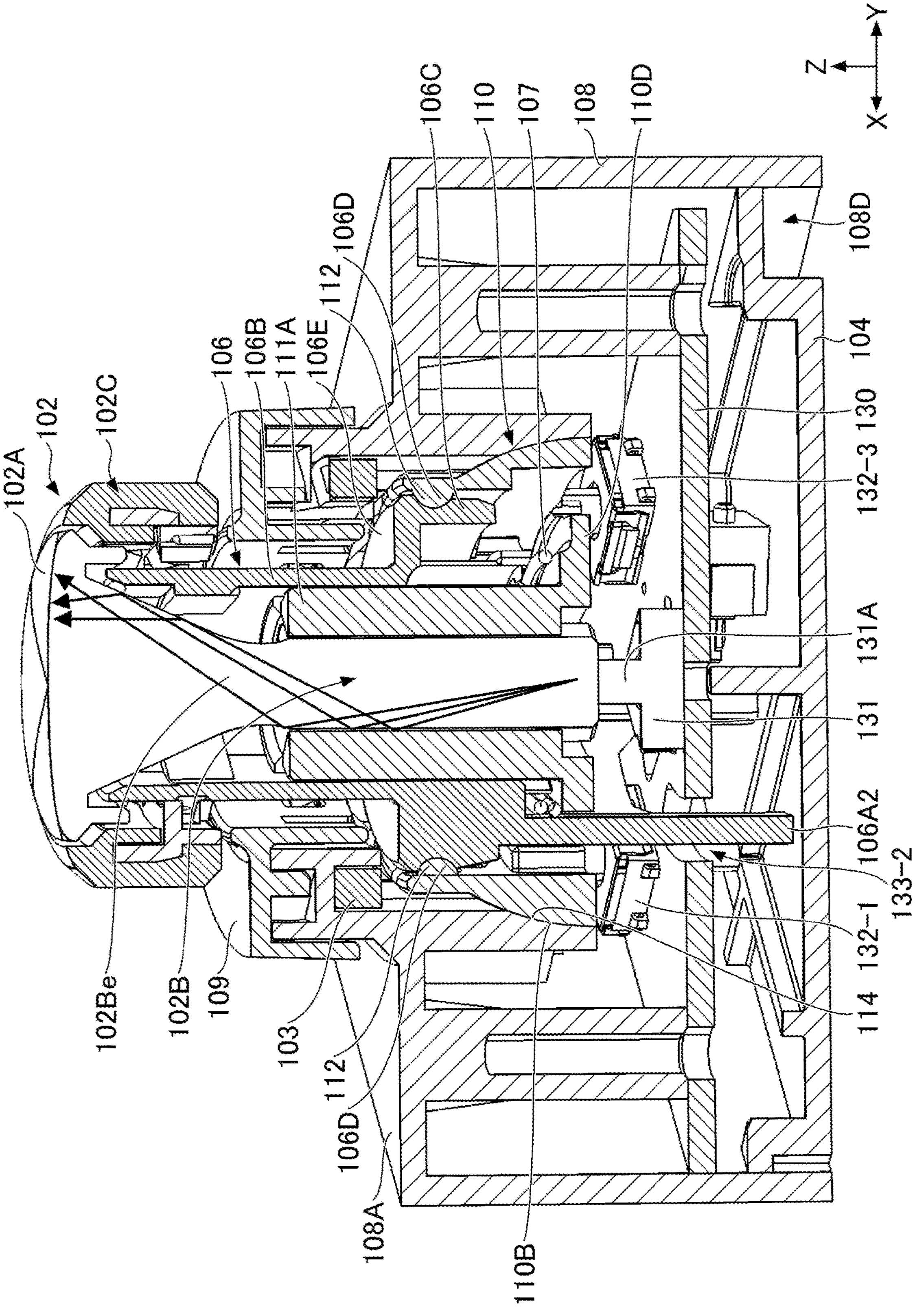
FIG. 12 is a perspective view of a cross section of the composite input device according to the embodiment taken along a plane that passes through a rotational axis.

The first wall portion 110B of the actuator 110 has a shape obtained by partially cutting out a spherical shape, and is a part provided in contact with the supporting surfaces 114 of the housing 108 as illustrated in FIG. 12. The first wall portion 1105 of the actuator 110 is urged against the supporting surfaces 114 of the housing 108 based on the restoring force of the tilt detection switches 132-1 to 132-4. As a result, the first wall portion 110B slides with respect to the supporting surfaces 114 of the housing 108, thus rotating the actuator 110 with respect to the housing 108 about the center of the spherical shape formed by the first wall portion 110B.

As illustrated in FIGS. 16 and 17, the second wall portion 110C of the actuator 110 is an assembly composed of multiple plate-shaped bodies extending upward from the upper end of the first wall portion 110B. Each plate-shaped body forming the second wall portion 1100 is disposed along the circumference of a cylindrical shape centered on the rotational axis AX. When coupled, the plate-shaped bodies forming the second wall portion 110C form a cylindrical shape centered on the rotational axis AX. The actuator 110 includes the supporting rotation portions 112 that protrude from the second wall portion 110C toward the rotational axis AX.

The actuator 110 includes an opening 110A formed by the second wall portion 110C. The holder 106, which is supported by the second wall portion 1100 of the actuator 110, is disposed in the opening 110A. The second cylinder portion 106C of the holder 106 is disposed opposing the second wall portion 110C of the actuator 110.

The support shaft 111 is a part where the shaft portion 102B of the knob 102 is inserted so that the knob 102 is slidably supported in the vertical direction. The shaft portion 102B of the knob 102 is inserted in the cylindrical shape formed by the support shaft 111. Furthermore, the support shaft 111 is a part that is inserted in the first cylinder portion 106B of the holder 106. When the outer peripheral surface of the support shaft 111 contacts the inner peripheral surface of the first cylinder portion 106B of the holder 106, the support shaft 111 serves as the rotational axis of the holder 106 and guides the rotation of the holder 106.

The base 110D of the actuator 110 is a part that couples the first wall portion 110B to the support shaft 111. The base 110D of the actuator 110 is a part that supports the holder 106 by contacting the protrusions 106F of the holder 106 illustrated in FIGS. 22A and 22B. The base 110D of the actuator 110 includes the opening 110E in which the arms 106A1 and 106A2 of the holder 106 are inserted. The opening 110E has an arc shape centered on the rotational axis AX. The base 110D of the actuator 110 includes the opening 110F in which the distal end portion 102Bc of the shaft portion 102B of the knob 102 is inserted. The opening 110E is disposed in a position that intersects with the rotational axis AX of the base 110D of the actuator 110. The base 110D of the actuator 110 includes two openings 110G where the engaging portions 107C of the torsion spring 107 are inserted and locked. Each opening 110G has an arc shape centered on the rotational axis AX. The radius of the arc formed by the opening 110G is greater than the radius of the arc formed by the opening 110F.

As illustrated in FIGS. 19 to 20B, the housing 108 includes eight guide walls 108E. The guide surfaces 108Ea of the housing 108 are shaped so as to restrict the rotation of the actuator 110 in the rotation directions D6 and D7 without impeding the rotation of the actuator 110 in the tilting directions D2 to D5 when the knob 102 is tilted. Each guide wall 1085 of the housing 108 has a flat-plate shape that is parallel to a corresponding one of the tilting directions D2 to D5, and extends in the vertical direction. A pair of the guide walls 108E of the housing 108 are provided for each of the tilting directions D2 to D5. The pair of guide walls 108E are disposed opposing each other with the pressing portion 113 interposed therebetween. Each guide wall 108E includes the guide surface 108Ea that is provided in contact with the pressing portion 113 of the actuator 110. The housing 108 includes the supporting surfaces 114 provided in contact with the first wall portion 110B of the actuator 110. The supporting surfaces 114 of the housing 108 have a recessed shape corresponding to the first wall portion 110B.

After the second cylinder portion 1060 is disposed above the opening 110A of the actuator 110 as illustrated in FIG. 11A, the holder 106 is fitted into the cylindrical shape formed by the second wall portion 1100 of the actuator 110. Concurrently, the support shaft 111 of the actuator 110 is inserted into the cylindrical shape formed by the first cylinder portion 106B of the holder 106. Also concurrently, the arms 106A1 and 106A2 of the holder 106 are inserted in the opening 110E formed in the base 110D of the actuator 110. Also concurrently, the supporting rotation portions 112 of the actuator 110 are fitted to supported rotation portions 106D of the holder 106. Also concurrently, the protrusions 106F of the holder 106, which are illustrated in FIGS. 22A and 22B, are abutted against the base 110D of the actuator 110. Also concurrently, the torsion spring 107 is disposed between the holder 106 and the actuator 110. In this manner, the holder 106 and the actuator 110 are integrated by assembling, the parts that are configured guide the rotation. Hence, the actuator 110 holds the holder 106 rotatably in the circumferential direction centered on the rotational axis AX.

The supporting rotation portions 112 of the actuator 110 are shaped to rotatably support the holder 106 and to lock the actuator 110 and the holder 106 when a tilting operation is performed on the knob 102. Each supporting rotation portion 112 has a hemispherical shape partially cut out from a spherical shape. The supporting rotation portions 112 of the actuator 110 are parts that rotatably support the holder 106. When seen from above, the supporting rotation portions 112 of the actuator 110 are provided at 90° intervals along the circumference of the second wall portion 110C. The outer peripheral surface of the second cylinder portion 106C of the holder 106 includes the supported rotation portions 106D at respective positions facing the four supporting rotation portions 112. Each supported rotation portion 106D has a recessed shape into which the supporting rotation portion 112 of the actuator 110 is fitted. Each supported rotation portion 106D of the holder 106 has a curved recessed shape that is formed along the outer peripheral shape of the second cylinder portion 106C. The supported rotation portions 106D of the holder 106 are formed parallel to the X-Y plane direction along a circumference centered on the rotational axis AX. When viewed from the circumferential direction of the outer peripheral surface of the second cylinder portion 106C, each supported rotation portion 106D of the holder 106 has recessed arc shape. The supporting rotation portions 112 of the actuator 110 and the supported rotation portions 106D of the holder 106 are shaped as guides that are provided in contact with each other. By fitting the supporting rotation portions 112 of the actuator 110 into the supported rotation portions 106D, the holder 106 is rotatably supported along the circumference centered on the rotational axis AX. By fitting the four supporting rotation portions 112 to the corresponding four supported rotation portions 106D, the holder 106 is prevented from slipping upward from the actuator 110. Hence, when the operator performs a tilting operation on the knob 102, the holder 106 and the actuator 110 tilt together without disassembling. In other words, the holder 106 and the actuator 110 are coupled to each other so as to restrict a relative movement in a direction parallel to the rotational axis AX, but to allow relative movement in the circumferential direction of the outer peripheral surface of the second cylinder portion 106C of the holder 106.

Note that in the embodiment, the composite input device 100 includes a configuration where the supporting rotation portions 112 have a protruding shape and the supported rotation portions 106D have a recessed shape. However, the composite input device 100 may include a configuration where the supporting rotation portions 112 have a recessed shape and the supported rotation portions 106D have a protruding shape.

As illustrated in FIG. 22D, the supported rotation portions 106D of the holder 106 are formed on the outer peripheral surface of the second cylinder portion 106C in a plan view in a direction parallel to the rotational axis AX. The supported rotation portions 106D of the holder 106 are formed along the circumference centered on the rotational axis AX. Four supported rotation portions 106E are provided in the holder 106. This number is the same as the number of the supporting rotation portions 112 of the actuator 110. Each supported rotation portion 106D is formed in range of angle of 50° on the outer peripheral surface of the second cylinder portion 106C along a circumference centered on the rotational axis AX.

Figure 23A:
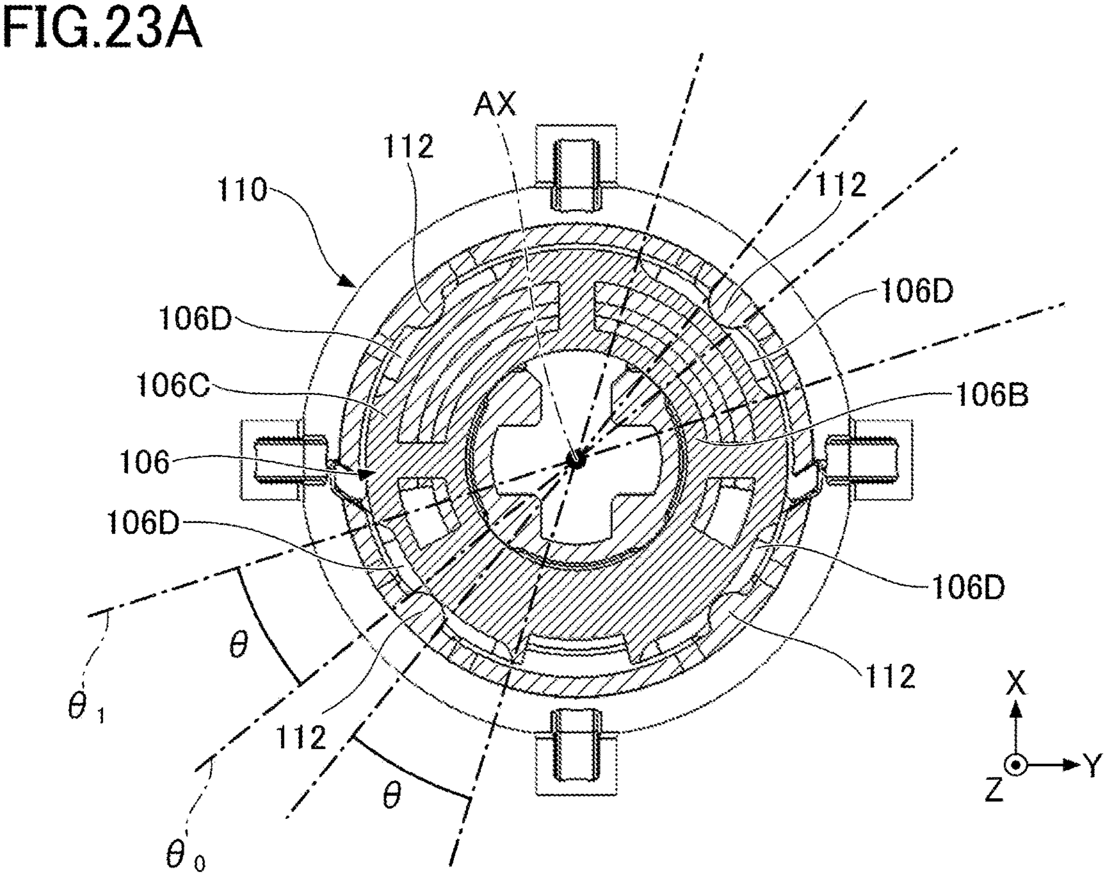
FIG. 23A is a cross-sectional view for explaining the arrangement of the holder and the actuator of the composite input device according to the embodiment in a neutral position.

FIG. 23A is a cross-sectional view for explaining the arrangement of the holder 106 and the actuator 110 in the neural position of the composite input device 100 according to the embodiment. FIG. 23A is a cross-sectional view for explaining the arrangement of the holder 106 and the actuator 110 when a rotation operation is performed in the composite input device 100 according to the embodiment.

Figure 23B:
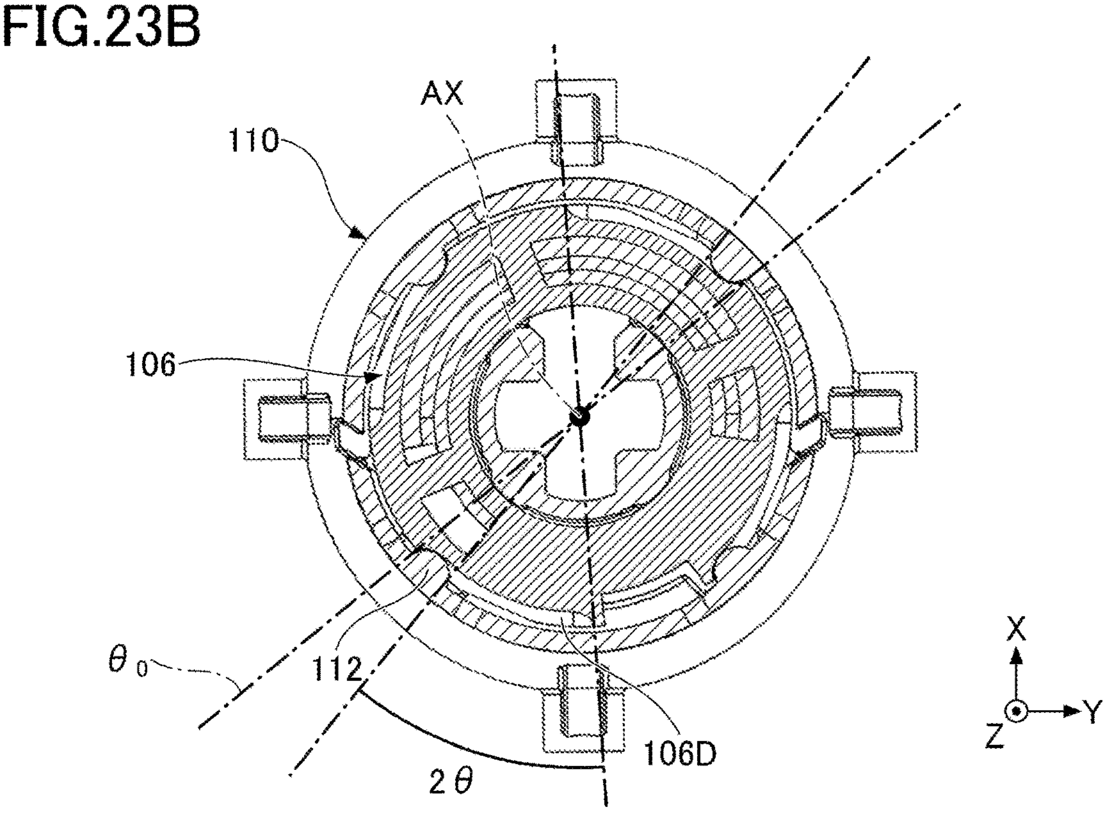
FIG. 23B is a cross-sectional view for explaining the arrangement of the holder and the actuator of the composite input device according to the embodiment in a state in which a rotating operation has been performed.

As illustrated in FIG. 23A, when viewed in a plan view from the direction parallel to the rotational axis AX in a state where the knob 102 has been released from operating force and has returned to the neutral position, each supporting rotation portion 112 of the actuator 110 is positioned at the center of the corresponding supported rotation portion 106D of the holder 106. At this time, an angular position 81 of an end of each supported rotation portion 106D of the holder 106 is positioned at a predetermined angle θ with reference (0°) to an angular position θ0 of a corresponding end of the supporting rotation portion 112 of the actuator 110. When the operator performs a rotating operation on the second operation portion 102C of the knob 102 in the rotation direction D7, the holder 106 is rotated counterclockwise about the rotational axis AX by the operating force. As illustrated in FIG. 23B, when the holder 106 is rotated to the terminal position of the rotating operation of the holder 106, the end of each supported rotation portion 106D abuts against the corresponding supporting rotation portion 112 of the actuator 110, and the holder 106 does not rotate any further. Subsequently, upon release from the operating force, the holder 106 returns to the neutral position based on the restoring force of the torsion spring 107, and transmits the restoring force to the second operation portion 1020 of the knob 102 to cause the second operation portion 102C to return to the neutral position. Therefore, the operator can perform a rotating operation on the second operation portion 102C of the knob 102 in the rotation direction D7 with a stroke of 0° to 20°.

In a similar manner, when the operator performs a rotating operation on the second operation portion 102C of the knob 102 in the rotation direction D6, the holder 106 is rotated clockwise about the rotational axis AX by the operating force. The holder 106 rotates until the terminal position and does not rotate any further. The operator can perform a rotating operation on the second operation portion 1020 of the knob 102 in the rotation direction D6 with a stroke of 0° to 20°.

(Other Features)

Figure 24:
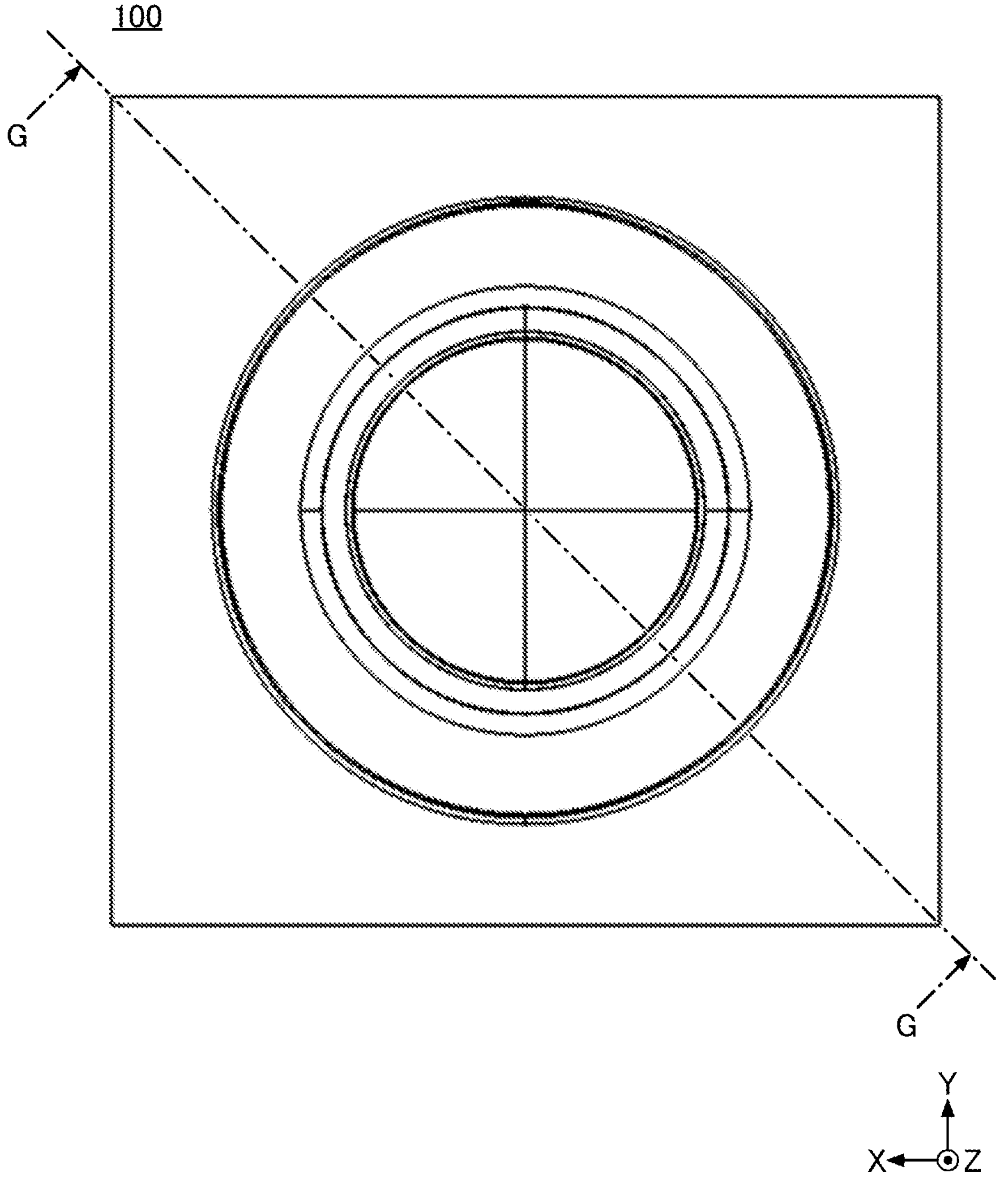
FIG. 24 is a top view of the composite input device according to the embodiment.

Other features of the composite input device 100 according to the embodiment will described hereinafter with reference to FIGS. 12 and 24. FIG. 12 is a perspective view of a cross section of the composite input device 100 according to the embodiment taken along a plane that passes through the rotational axis AX. FIG. 24 is a top view of the composite input device 100 according to the embodiment. FIG. 12 is a cross-sectional view of the composite input device 100 according to the embodiment taken along a line G-G indicated in FIG. 24.

As illustrated in FIG. 12, the actuator 110 is supported by the holder 106 based on the engagement of the supporting rotation portions 112 of the actuator 110 and the supported rotation portions 106D of the holder 106. Here, as illustrated in FIG. 12, since each supporting rotation portion 112 of the actuator 110 has a hemispherical shape partially cut out from a spherical shape, the shape of the cross section of each supporting rotation portion 112 is a semicircle in a cross-sectional view taken along a plane that passes through the rotational axis AX. The shape of the cross section of each supported rotation portion 106D of the holder 106 is semicircle, and each supported rotation portion 106D has recessed shape into which the supporting rotation portions 112 is fitted. Hence, the cross section of the point of contact between the supporting rotation portions 112 and the supported rotation portions 106D has a semicircular shape. This semicircular shape includes both a portion approximately vertical with respect to the upper direction (+Z-axis direction) and a portion approximately vertical with respect to the lower direction (−Z-axis direction). The supported rotation portions 106D and the supporting rotation portions 112 are arranged at positions close to an imaginary line extended from an arc formed by the supporting surfaces 114 (to be described later). Hence, in the composite input device 100 according to the embodiment, when the operator performs a tilting operation on the knob 102 and an upward force (in the +Z-axis direction) is applied on the point of contact between each supporting rotation portion 112 and the corresponding supported rotation portion 106D, the supporting rotation portions 112 and the supported rotation portions 106D do not become unlocked. In a similar manner, in the composite input device 100 according to the embodiment, when the operator performs a tilting operation on the knob 102 and a downward force (in the −Z-axis direction) is applied on the point of contact between each supporting rotation portion 112 and the corresponding supported rotation portion 106D, the supporting rotation portions 112 and the supported rotation portions 106D do not become unlocked. In other words, for example, when the operator performs a tilting operation on the knob 102 and applies an operating force in a left-right direction with respect to the page of FIG. 12, the holder 106 and the actuator 110 will rotate integrally in a clockwise direction and a counter clockwise direction with respect to the page of FIG. 12. At this time, an upward force (in the +Z-axis direction) or a downward force (in the −Z-axis direction) is applied on the point of contact between each supported rotation portions 106D and the corresponding supporting rotation portions 112. However, even when an upward force or a downward force is applied, since each supported rotation portion 106D and the corresponding supporting rotation portion 112 include portions approximately vertical to the direction of the applied force, the holder 106 and the actuator 110 do not become disengaged from each other by the operating force of the ti operation. Hence, there is no displacement between the parts of the holder 106 and the parts of the actuator 110. Furthermore, the holder 106 and the actuator 110 do not become disassembled.

In addition, as illustrated in FIGS. 12 and 14, the shaft portion 102B of the knob 102 has a cylindrical shape, which is centered on the rotational axis AX, and is inserted in the support shaft 111 of the actuator 110. The knob 102 includes the light diffusion portion 102Be formed on the middle portion between the shaft portion 102B and the first operation portion 102A. The outer shape of the light diffusion portion 102Be is a quadratic surface shape. More specifically, the outer shape of the light diffusion portion 102Be is a one-sheet hyperboloid shape. Note that when the light diffusion portion 102Be is cut perpendicular to the rotational axis AX, the outer shape of the cross section will be a perfect circle no matter where the light diffusion portion 102Be is cut. However, the outer shape of the cross section may be an ellipse.

The area of the shaft portion 102B cut perpendicular to the rotational axis AX is smaller than the area of the first operation portion 102A in a plan view in a direction parallel to the rotational axis AX. The area of the shaft portion 102B cut perpendicular to the rotational axis AX at a height position where the radius is smallest is smaller than the area of the shaft portion 102B cut perpendicular to the rotational axis AX. Hence, most of the light from the LED 134 guided inside the shaft portion 102B hits and is reflected by the light diffusion portion 102Be before reaching the first operation portion 102A, changes its direction of the travel, is diffused, and subsequently reaches the first operation portion 102A. As a result, the distribution of luminance on the illuminated first operation portion 102A becomes uniform without bias.

Furthermore, as illustrated in FIG. 12, the first wall portion 110B of the actuator 110 has shape partially cut out from a spherical shape. Also, inside the housing 108, supporting surfaces 114 provided to face the first wall portion 110B of the actuator 110 have recessed spherical shape that has the same curvature as the curvature of the first wall portion 110B of the actuator 110. As a result, in the composite input device 100 according to the embodiment, when the operator performs a tilting operation on the knob 102, the outer surface of the first wall portion 110B slides on the supporting surfaces 114 of the housing 108. Thus, the actuator 110 rotates about the center of the spherical shape formed by the first wall portion 110B.

An embodiment of the present invention has been described above. However, the present invention is not limited to the embodiment described above. Various changes and modifications can be applied without departing from the scope of the present disclosure defined in the appended claims.

What is claimed is:

1. A composite input device comprising:

a first detector configured to detect a rotating operation;

a second detector configured to detect a tilting operation; and a substrate disposed perpendicular to a rotational axis of the rotating operation, the substrate having a through hole, wherein the first detector includes a first member configured to rotate based on the rotating operation performed by an operator, and a first contact disposed on the substrate and configured to be switched on or off when the first member is shifted, wherein the first member includes an insertable portion configured to be inserted the through hole, wherein the first member is configured to switch the first contact on or off by the insertable portion, and wherein in a plan view in a direction perpendicular to the substrate, the first detector is disposed inside an imaginary circle, the imaginary circle having a center at an intersection of the substrate and the rotational axis of the rotating operation and having an outer circumference that passes through an outer edge of the second detector positioned farthest away from the center of the imaginary circle.

2. The composite input device according to claim 1, wherein the second detector includes a second member configured to tilt based on the tilting operation performed by the operator, and a second contact configured to be switched on or off when the second member is shifted.

3. The composite input device according to claim 2, wherein the second contact is disposed on a surface on one side of the substrate, and wherein the first contact is disposed on the other side of the substrate.

4. The composite input device according to claim 2, wherein a third detector is provided, the third detector including a third member configured to slide based on the pressing operation performed by the operator, and a third contact configured to be switched on or off when the third member is shifted.

5. The composite input device according to claim 4, wherein the third contact is disposed on the surface on the other side of the substrate.

6. The composite input device according to claim 1, wherein in the plan view from the direction perpendicular to the substrate, the through hole is disposed inside the imaginary circle.

7. The composite input device according to claim 1, wherein in the plan view from the direction perpendicular to the substrate, the through hole has an arc shape centered on the rotational axis of the first member.

8. The composite input device according to claim 2, further comprising a housing, wherein the second member has a spherical outer surface configured to slide against the housing.

9. The composite input device according to claim 4, wherein the third member is a light guide that has a light transmitting property.

10. The composite input device according to claim 2, wherein either the first member or the second member includes a supported rotation portion that has a recessed arc shape when viewed in a circumferential direction provided along a circumference centered on the rotational axis of the first member, wherein the other of the first member or the second member includes a supporting rotation portion that has a protruding spherical shape configured to be engaged with the arc shape of the supported rotation portion, and wherein while the supporting rotation portion is engaged with the supported rotation portion, the first member and the second member are coupled to be restricted from moving relative to each other in a direction parallel to the rotational axis and to be movable relative to each other in the circumferential direction.

11. A composite input device comprising:

a housing;

a first detector configured to detect a rotating operation;

a second detector configured to detect a tilting operation;

a substrate disposed perpendicular to a rotational axis of the rotating operation;

a first member configured to rotate based on the rotating operation performed by an operator;

a second member configured to tilt based on the tilting operation performed by the operator; and a third member configured to receive an input from the operator and slide based on a pressing operation performed by the operator, wherein in a plan view in a direction perpendicular to the substrate, the first detector is disposed inside an imaginary circle, the imaginary circle having a center at an intersection of the substrate and the rotational axis of the rotating operation and having an outer circumference that passes through an outer edge of the second detector positioned farthest away from the center of the imaginary circle, and wherein the second member includes a supporting rotation portion, a wall portion, and a slide guide, the supporting rotation portion having a first shape configured to contact and rotatably support the first member, the wall portion having a second shape that is spherical and configured to slide against the housing, and the slide guide having a third shape configured to contact and slidably support the third member.

* * * * *